US006173191B1

(12) United States Patent
Jennings, III

(10) Patent No.: US 6,173,191 B1
(45) **Date of Patent: *Jan. 9, 2001**

(54) LOCALIZATION OF SHAPED DIRECTIONAL TRANSMITTING AND TRANSMITTING/RECEIVING ANTENNA ARRAY

(75) Inventor: Earle Willis Jennings, III, San Jose, CA (US)

(73) Assignee: mDivesity Inc., San Jose, CA (US)

( * ) Notice: Under 35 U.S.C. 154(b), the term of this patent shall be extended for 0 days.

This patent is subject to a terminal disclaimer.

(21) Appl. No.: 09/001,370

(22) Filed: Dec. 31, 1997

(51) Int. Cl.[7] .......................................... H04B 1/00
(52) U.S. Cl. .......................................... 455/562; 455/277.1
(58) Field of Search .......................................... 455/550, 561, 455/562, 575, 90, 277.1, 277.2; 343/702; 342/371

(56) References Cited

U.S. PATENT DOCUMENTS 6,072,788 * 6/2000 Peterson .......................................... 370/337
6,091,970 * 7/2000 Dean .......................................... 455/562
6,097,969 * 8/2000 Angus .......................................... 455/562

* cited by examiner

*Primary Examiner*—Daniel S. Hunter
*Assistant Examiner*—Nick Corsaro
(74) *Attorney, Agent, or Firm*—David E. Lovejoy

(57) ABSTRACT

A micro-diverse directional transmitting antenna array positioned proximately upon the boundary of a convex shape whereby the primary attenuation lobes of neighboring antennae overlap. Distinct transmissions by distinct directional antenna components utilize the same channel resources using transmitting directional antenna components that are not adjacent. Further, a micro-diverse directional antenna array comprising both transmitting and receiving directional antenna components positioned proximately upon the boundary of a convex shape whereby the primary attenuation lobes of nearest neighbor transmitting directional antenna components overlap and the primary attenuation lobes of nearest neighbor receiving directional antenna components overlap. This creates a situation in which the reception of signals by said array from the user (uplink) space-time-delay domain of transmission is effectively modeled as a banded linear transformation upon discretized space-time-delay domain of transmission yielding the antenna reception at discrete time steps.

22 Claims, 23 Drawing Sheets

LOCALIZATION OF SHAPED DIRECTIONAL TRANSMITTING AND TRANSMITTING/RECEIVING ANTENNA ARRAY

BACKGROUND

Purpose of the invention: General Statement of the problem

- Improve ability to localize transmission of diverse signals to a multiplicity of geographically distinct destinations.
- Improve downlink and uplink channel reuse in a given area.
- Improve reception of wireless broadcast signals from users by sampling an array of directional antennae to derive the local transmission field strength.
- The basic method uses a lumped location model as an approximation to computationally isolate dispersed multi-user transmission and reception.
- Methods utilizing this approach rely on a combination of antennas and signal processing to transmit and receive user transmissions.

Application Examples

- Base station transceivers wherein the uplink bandwidth is comparable to the downlink bandwidth. Such applications include situations wherein there is a greater density of users than can readily be afforded. Such applications include but are not limited to:
  - CDMA multi-user base station transceivers in densely populated areas.
  - FDMA, TDMA and GSM multi-user base station transceivers in densely populated areas.
  - SDMA multi-user base station transceivers in densely populated areas.
- Other spread spectrum base station transceivers where the downlink bandwidth is a multiplicative factor greater than the uplink bandwidth:
  - National Information Infrastructure (NII) neighborhood base station transceivers
  - Video and Movie On Demand wireless base station transceivers
- Improved multi-carrier transceivers

Prior Art Approaches

Overview

This section discusses location determination based upon several different kinds of antennas:

- Single omni-directional antenna determination.
- Lee style pair of receiving antennas to minimize cochannel interference.
- Phased array background.
- Macro-diverse location determination.

Single omni-directional antenna determination
- Basic Mechanism
- Advantages
- Disadvantages Lee style wireless base station antenna sets
- Basic Mechanism
- Advantages
- Disadvantages
- Directional antenna discussion Phased array background
- Basic Mechanism
- Advantages
- Disadvantages
- D3

Domed Lens phased arrays
- Basic Mechanism
- Advantages
- Disadvantages

Circular Phased Arrays
- Basic Mechanism
- Advantages
- Disadvantages

Macro-diverse location determination
- Basic Mechanism
- Advantages
- Disadvantages
- D3
- Spectrum Patent 1
- Very Large Array and other long distance interferometers
- NASA deep space communication systems References 1. Viterbi, Andrew J., *CDMA: principles of spread spectrum communication*, (c) 1995, Addison Wesley Longman, Inc., ISBN 0-201-63374-4
2. Mouly, Michel and Marie-Bernadette Pautet, *The GSM System for Mobile Communications*, (c) 1992, Mouly and Pautet, ISBN 2-9507190-0-7
3. Lee, William C. Y., *Mobile Cellular Telecommunications: Analog and Digital Systems,* 2$^{nd}$ ed., (c) 195, 1989 McGraw Hill, Inc., ISBN 0-07-038089-9
   a. Chapter 5: "Cell-Site Antennas and Mobile Antennas"
   b. Chapter 6: "Co-channel Interference Reduction"
4. Mehrota, Asha, *Cellular radio: analog and digital systems*, (c) 1994 Artech House, Inc., ISBN 0-89006-731-7
5. Sreetharan, Mothothamby and Rajiv Kumar, *Cellular digital packet data*, (c) 1996 Artech House, Inc., ISBN 0-89006-709-0
6. Toh, C-K, *Wireless ATM and ad-hoc networks: protocols and architectures*, (c) 1997 Kluwer Academic Publishers, ISBN 0-7923-9822-X
7. Monzingo, Robert A., *Introduction to adaptive arrays*, (c) 1980 John Wiley and Sons, Inc., ISBN 0-471-05744-4
8. Simon, Marvin K., Jim K. Omura, Robert A. Schultz, Barry K. Levitt, *Spread Spectrum Communications*, vol. III, (c) 1985 Computer Science Press, Inc. ISBN 0-88175-015-8 (v. III), ISBN 0-88175-017-4 (Set)
9. Balanis, Constantine A. *Antenna Theory: Analysis and Design*, (c) 1982 Harper & Row, Publishers, Inc., ISBN 0-06-040458-2
10. Shannon, Claude E. and Warren Weaver, *The Mathematical Theory of Communication*, (c) 1949 Board of Trustees of the University of Illinois, Illini Books edition, 1963, ISBN 0-252-72548-4
11. Gibson, Jerry D. (editor) *The mobile communications handbook*, (c) 1996 CRC Press, Inc., ISBN 0-8493-8573-3
    a. Milstein, L. B. and M. K. Simon, "Spread Spectrum Communications"
12. Sklar, Bernard, *Digital Communications: Fundamentals and Applications*, (c) 1988 P. T. R. Prentice Hall, ISBN 0-13-211939-0
13. Wilson, Stephen G., *Digital Modulation and Coding*, (c) 1996 Prentice-Hall, Inc., ISBN 0-13-210071-1

14. Kesteloot, Andre, Charles L. Hutichinson and Joel P. Kleinman (editors), *The ARRL Spread Spectrum Sourcebook*, (c) 1991 American Radio Relay League, ISBN 0-87259-317-7

15. Papas, Charles Herach, *Theory of electromagnetic wave propagation*, (c) 1965, 1988 Charles Herach Papas, Dover edition, ISBN 0-486-65678-0

16. Doble, John, *Introduction to radio propagation for fixed and mobile communications*, (c) 1996 Artech House, Inc., ISBN 0-89006-529-2

17. Straw, R. Dean, Gerald L. Hall, Brian Beezley, *The ARRL Antenna Book*, (c) 1994 American Radio Relay League, ISBN 0-87259-473-4

18. Danzer, Paul, Joel P. Kleinman, R. Dean Straw (editors), *The ARRL Handbook for Radio Amateurs*, 75$^{th}$ edition, (c) 1997 American Radio Relay League, ISBN 0-87259-178-6

19. Johnson, Richard C., Henry Jacik (ed.), *Antenna Engineering Handbook* 3$^{rd}$ ed., (c) 1993, 1984, 1961 McGraw-Hill, Inc., ISBN 0-07-032381-X 20. Lo, Y. T., S. W. Lee (ed.), *Antenna Handbook vol II: Antenna Theory*, (c) 1993 Van Nostrand Rheinhold, ISBN 0-442-01593-3
   a. Lo, Y. T., "Array Theory", Chapter 11
   b. Mailloux, R. J., "Periodic Arrays", Chapter 13
   c. Lo, Y. T., "Aperiodic Arrays", Chapter 14
   d. Rahmat-Samii, Y., "Reflector Antennas", Chapter 15
   e. Lee, J. J., "Lens Antennas", Chapter 16

21. Lo, Y. T., S. W. Lee (ed.), *Antenna Handbook vol III: Applications*, (c) 1993 Van Nostrand Rheinhold, ISBN 0-442-01594-1
   a. Tang, Raymond, "Practical Aspects of Phased Array Design", Chapter 18

22. Courant, R. and D. Hilbert, *Methods of Mathematical Physics vol. I*, Chapter 1: "The Algebra of Linear Transformations and Quadratic Forms", (c) 1937 Julius Springer, Berlin, 1$^{st}$ English edition, republished by John Wiley & Sons, 1989, ISBN 0-471-50447-5.

23. Kaiser, Gerald, *A friendly guide to wavelets*, (c) 1994 Birkhauser, Boston, ISBN 0-8176-3711-7

Patent References

24. Stangel, John J., et. al., U. S. Pat. No. 3,755,815, "Phased Array Fed Lens Antenna", filed Dec. 20, 1971, issued Aug. 28, 1973

25. Giannini, Richard J., U.S. Pat. No. 3,816,830, "Cylindrical Array Antenna", filed Nov. 27, 1970, issued Jun. 11, 1974

26. Stangel, John J., et. al. U.S. Pat. No. 4,451,831, "Circular array scanning network", filed Jun. 29, 1981, issued May 29, 1984

SUMMARY OF THE INVENTION

Definitions
- Convex shape
- Normal
- Cellular communications system
  - Base Station
  - uplink
  - downlink
  - users
  - channels
- Antenna
  - Directional
  - Omnidirectional
- Antenna Attributes
- Antenna Array
  - Phased array
  - Dual cochannel interference canceling
  - Micro-diverse
  - Macro-diverse Goals of this family of mechanisms Improve ability to transmit to a large number of spatially distributed users by geometrically partitioning the transmission process.

Improved downlink support for increased channel reuse.

Improved ability to isolate uplink user transmissions by means of geometrically partitioning the space-time delay domain of transmission.

This geometrical partitioning of the downlink and uplink transmission domain is made possible by the geometry of the claimed antenna arrays and claimed signal processing which is derived based upon the claimed antenna array geometry.

Basic Mechanism

A micro-diverse directional transmitting antenna array positioned proximately upon the boundary of a convex shape whereby the primary attenuation lobes of neighboring antennae overlap. Distinct transmissions by distinct directional antenna components can utilize the same channel resources if the transmitting directional antenna components are not adjacent.

Further, a micro-diverse directional antenna array comprising both transmitting and receiving directional antenna components positioned proximately upon the boundary of a convex shape whereby

- the primary attenuation lobes of nearest neighbor transmitting directional antenna components overlap and
- the primary attenuation lobes of nearest neighbor receiving directional antenna components overlap.

This creates a situation in which

- the reception of signals by said array from the user (uplink) space-time-delay domain of transmission can be effectively modeled as a banded linear transformation upon discretized space-time-delay domain of transmission yielding the antenna reception at discrete time steps.
- Distinct transmissions by distinct directional antenna components can utilize channel resources if the transmitting directional antenna components are not adjacent.

The discretized space-time-delay domains of uplink and downlink transmission have favored coordinate systems which will be seen to simplify calculation of said linear transformation. Said banded linear uplink and downlink transformations are approximations of the collective attenuation map of the uplink and downlink antenna array components, respectively.

Said banded uplink linear transformations under very broad conditions are known to be invertible with numerically stable inverses, which are also banded. Said numerically stable inverse implies that the discretized space-time-delay domain of transmission can be derived by a said inverse of said banded linear transformation of the discretized space-time-delay domain of transmission applied to the discretely sampled received signals by said antenna array over time.

Stated in a mathematically equivalent form: The discretized space-time-delay uplink domain of transmission can be approximately derived from a collection Finite Impulse Response filters applied to the antenna array reception samples.

The issue of side lobes for both uplink and downlink antenna components in said directional antenna arrays are rendered secondary and the issue of structuring the attenuation contour map to support acceptable linear transformations primary, thus leading to a new paradigm in antenna architecture.

Basic Advantages

The downlink transmissions achieve the ability to densely reuse the downlink channels for a given geographical area. Wireless multimedia distribution in densely populated urban settings is significantly improved. This greatly reduces the cost of deployment and maintenance of the transceivers necessary for such applications. It also aids support of cellular telephone usage in extremely dense urban settings such as rush hour and the crowds near sporting, entertainment and other highly populous events.

The entire discretized space-time-delay uplink transmission domain can be approximated by the filtered reception of said antenna arrays. This has the advantage of isolating the number of cellular users to be processed to a reasonable number for base station call processing in application situations experiencing extremes in user density.

This has the advantage of providing a significant processing gain to the reception of start of communications messages from wireless communications system users.

This has the advantage of providing a means of isolating much of the multi-path components of uplink transmission into manageable time-step related dispersion patterns, which can then be integrated to increase processing gain.

Use of two or more of these antenna arrays in a macro-diverse configuration further refines a said approximation of the discretized uplink space-time-delay user transmission domain.

Said refinements increase the accuracy of said uplink models. Said increases in accuracy bring greater gain to the derived received signals of the user transmission domain.

Versions of the invention which cover a symmetric convex shape's surface, such as a sphere's or octagon's, with symmetrically positioned and oriented directional antenna components will possess symmetric attenuation contour maps, which means that there will be no non-uniform side lobes.

DETAILED DESCRIPTION

Figure 1:
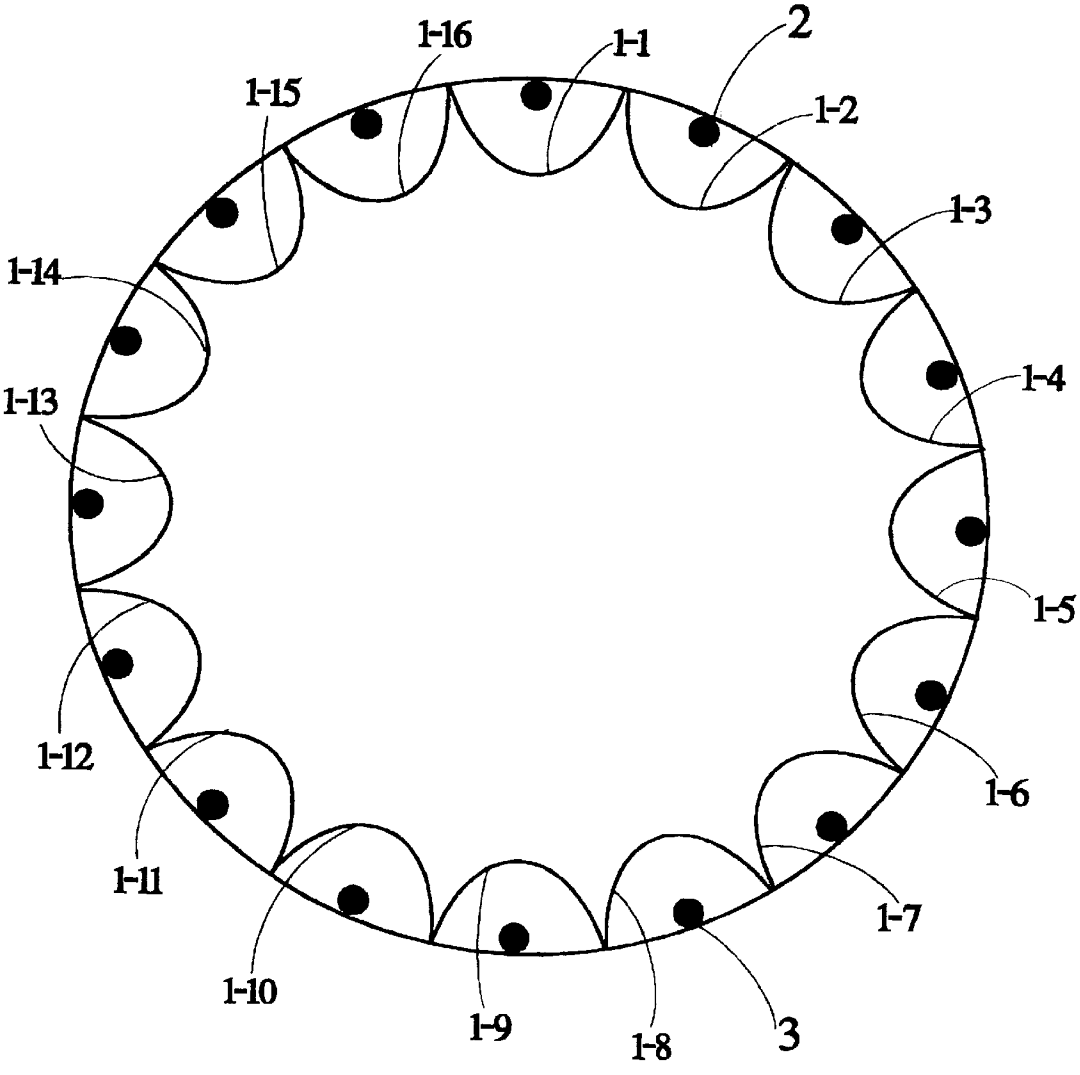
FIG. 1 depicts a 2-D circular a directional antenna array embodiments.
Figure 2:
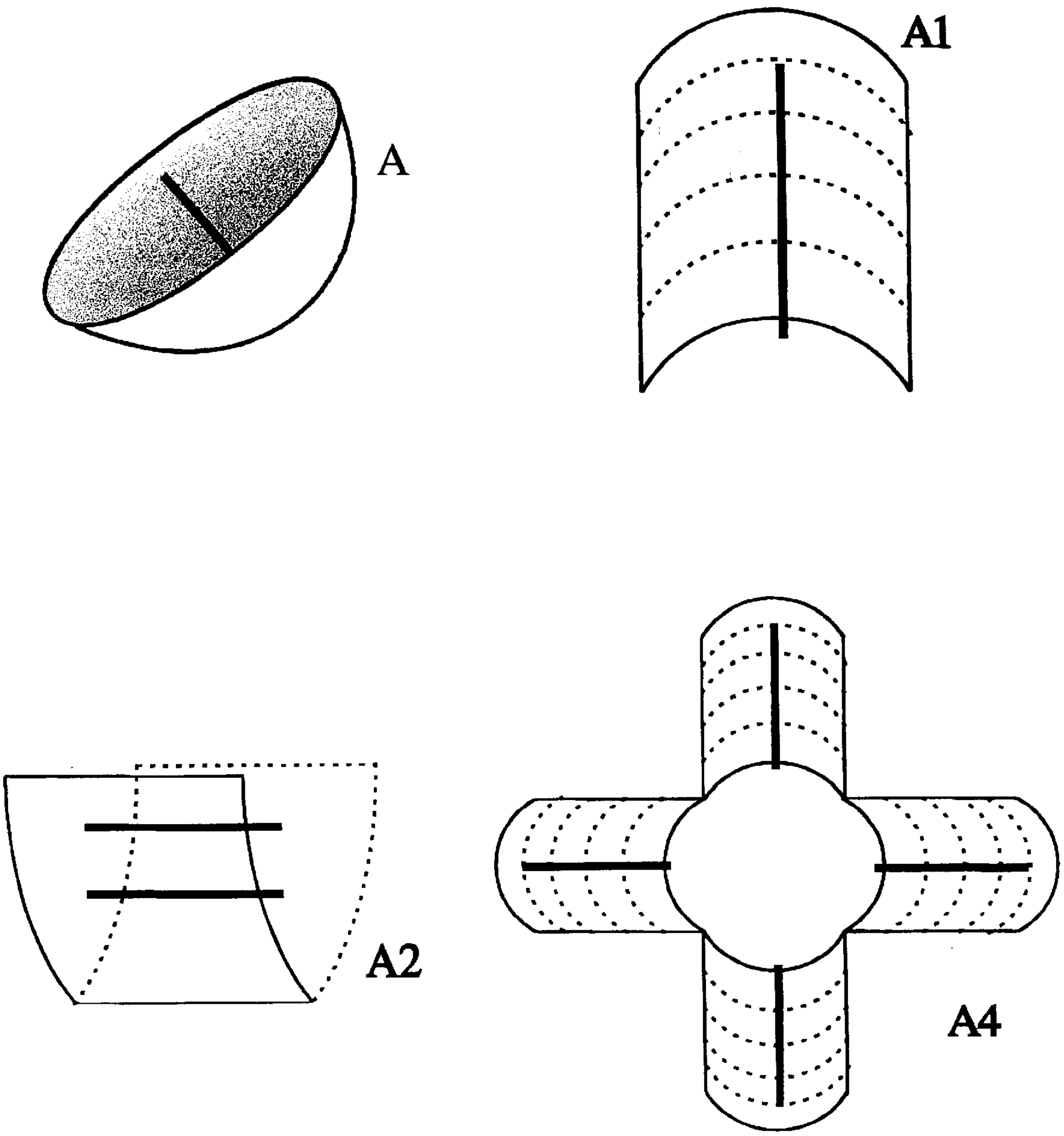
FIG. 2 depicts a typical directional antenna components
Figure 3:
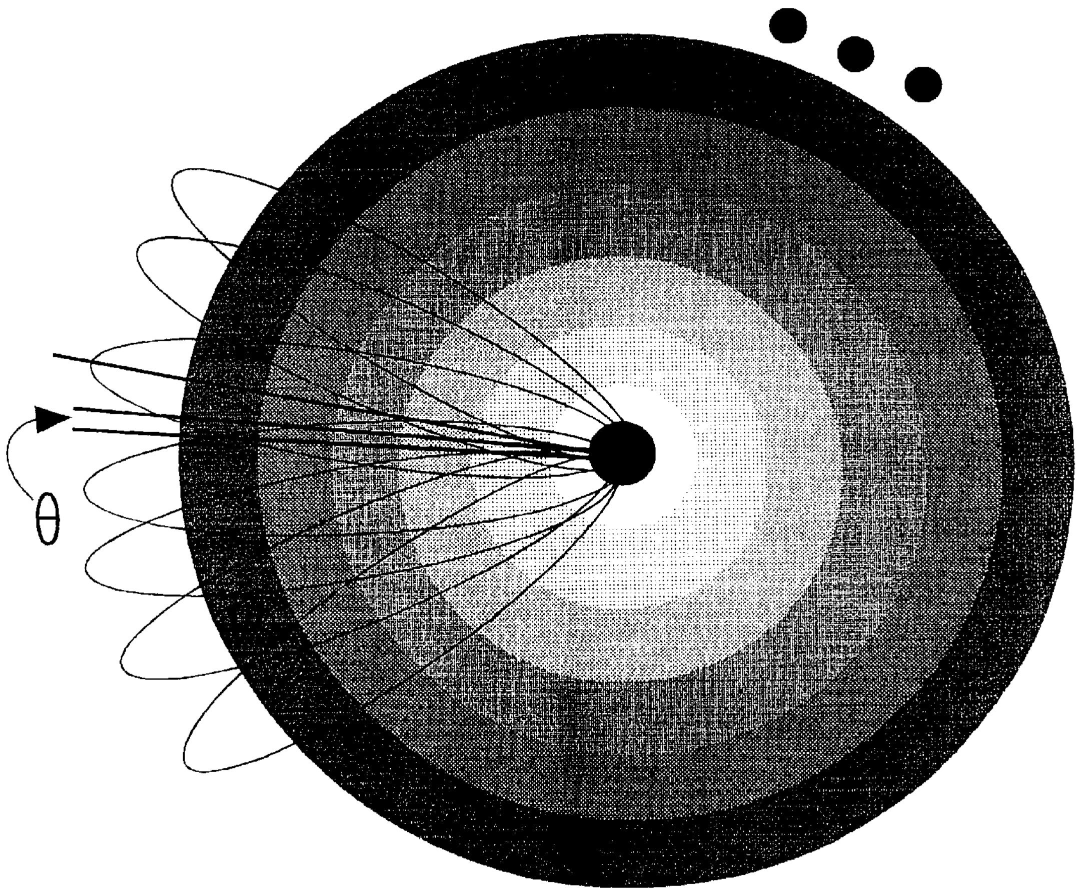
FIG. 3 depicts a basic 2-D picture of a space-time-delay user transmission domain relative to the antenna array coordinate system and collective attenuation contour map.

Directional Antenna Circular Array (FIGS. 1, 2 and 3)

Overview:

Consider FIG. 1: Disclosed therein is a collection of reflector directional antennae wherein the component directional antenna architecture incorporates two or more of the directional antenna components disclosed in but not limited to FIG. 2.

The 2-D attenuation contour map of the primary lobes of each of the directional antennae is shown superimposed in FIG. 3.

FIG. 1:

The preferred embodiment is an array of 16 directional reflector antenna components arranged optimally in a uniform pattern such that the reflecting surfaces associated with said directional antenna components form a connected surface when in operation.

Note that any of the four basic directional antennas disclosed in FIG. 2 can be used as the component directional antenna to give distinct embodiments. Note also that the number of directional antenna components may vary. Certain preferred embodiments will utilize more than one type of directional antenna component, or may vary the parameters of said directional antenna components, such as aperture width.

It is apparent to one skilled in the art, that the 2-D attenuation contour maps will differ depending not only on which type of directional antenna is used, but also on the carrier frequency(ies) employed, the length of the antenna elements, shape of the reflectors and the geometric parameters characterizing the relationship between the antenna element and reflector of each antenna component.

While these are relevant and essential issues which must be addressed in developing working antenna systems, these issues tend to obscure the architectural issues which are central to this invention. They will not be mentioned hereafter because of this. The discussion of attenuation will instead focus on a general discussion so that the primary insights and their application to this invention will be less clouded in detail.

The directional antenna components are denoted by 1-1 to 1-16. Each directional antenna component comprises a reflector, and one or more radiating components designated by 2. Note that only one directional antenna component has had its radiating components designated, but that all directional antenna components have appropriate radiating components.

There is a membrane 3 which encapsulates the antenna array so that the array presents a smooth surface to the external environment. The membrane is composed of one or more materials which are transparent to the operational frequencies of the antenna array.

In certain preferred embodiments, portions of the membrane covering a given antenna component may be opaque to certain frequencies or polarizations used by adjacent antenna components.

In some preferred embodiments, said radiating elements of said directional antenna components are not in line of sight with each other. The reflector components of said directional antenna components block line of sight. This situation has the advantage of limiting the inductive coupling of one radiating component of a directional antenna component upon the radiating component of an adjacent directional antenna component's radiating component.

The discussions of covering membranes and line of sight issues for the radiating components of the directional antenna components apply to all discussed preferred embodiments hereafter and will not be repeatedly discussed in the interest of brevity.

In certain preferred embodiments, alternating antenna components are employed for reception and for transmission.

FIG. 2:

This invention will focus its discussion but is not limit its claims to four basic directional antenna components, all of a reflector type. In any of the directional array antenna configurations, unless explicitly noted, similar application discussions could be developed based upon all the components listed in this figure and discussed hereafter.

Type A directional antenna component:

This preferred embodiment is a parabolic reflector antenna with radiating component approximately located along the major axis of the paraboloidal reflector. The radiating component will be assumed to be attached approximately along the axis to the reflector.

Note that in some preferred embodiments, the radiating component may optimally be a helical configuration.

The base location vector will be considered to be the point of intersection of the major axis and the reflector surface. The orientation direction vector will be defined to be the vector from the base location vector which ends at the extreme end of the radiating component.

Type A1 directional antenna component:

This preferred embodiment is a parabolic sheet reflector antenna with radiating component approximately located along the focal line of the parabolic sheet reflector. The radiating component can be considered to be a rigid wire attached to the reflector sheet in any of several ways including but not limited to being attached at the ends or being attached to the back of the sheet.

Dipole versions of A1 are preferred embodiments in some applications wherein the radiating component comprises two rigid wires instead of one. Dipole wiring is well understood in the art, with typical attachment of antenna feed being in the midpoint of the radiating component.

The base location vector will be considered to be the point of intersection of the major axis and the reflector surface. The orientation direction vector will be defined to be the vector from the base location vector which ends at the extreme end of the radiating component.

Type A2 directional antenna component:

This preferred embodiment is a parabolic sheet reflector antenna with radiating component approximately located along the major axis of the parabolic sheet reflector. The radiating component can be considered to be a pair of parallel rigid wires attached to the reflector sheet in any of several ways including but not limited to being attached at the ends or being attached to the back of the sheet.

In certain preferred embodiments either the other radiating component wires located closer or further away from the reflector sheet will reside at the focal line of the reflector sheet. Certain preferred embodiments will incorporate a distance between the two radiating component wires which is related to the carrier wavelength. Certain preferred embodiments will incorporate radiating component wires of differing length.

Dipole versions of A2 are preferred embodiments in some applications wherein the radiating component comprises two rigid coplanar wires are used instead of one wire in one or both of the wire components of the radiating components. Dipole wiring is well understood in the art, with typical attachment of antenna feed being in the midpoint of the radiating component.

The base location vector will be considered to be the midpoint of the reflector surface. The orientation direction vector will be defined to be the vector from the base location vector which ends at one end of the furthest wire radiating component. The choice of which end is arbitrary, but should be consistent within instances of this class of components in a specific embodiment such that antenna polarization can be derived in a consistent fashion.

Type A4 directional antenna component:

This preferred embodiment is a quadra-pole parabolic sheet reflector antenna with radiating component approximately located along the focal lines of the four parabolic sheet reflectors. Each said radiating component can be considered to be a rigid wire attached to said corresponding reflector sheet in any of several ways including but not limited to being attached at the ends or being attached to the back of the sheet.

Preferred embodiments include use of two or more rigid wires in each of the four radiating components in a fashion as disclosed in the discussion of A2 directional antenna component above.

The base location vector will be considered to be the point of intersection of the midpoint lines of the four reflector surfaces. The orientation direction vector will be defined to be the vector from the base location vector which ends at an end furthest removed from the base location vector of the furthest wire radiating component. Which one of said radiating components in arbitrary, but should be consistent within instances of this class of components in a specific embodiment such that antenna polarization can be derived in a consistent fashion.

FIG. 3:

A schematic view of the contour map of a typical attenuation function of such a circular directional antenna array.

The coordinate frame used hereafter is constructed as follows: A polar coordinate system is used. Radial distance is in units of the propagation distance within the medium traversed in the sampling time step. Angular measure is taken relative to some axis. This axis can be arbitrarily chosen in theory.

However, the practical choice will be to make optimal use of the uniformity of the antenna array. Best choices are to design the array to have a multiple of 4 directional antenna components. The angular measures would then be done form an axis chosen so that the contour map of the primary attenuation lobes is as symmetrical as possible to simplify calculations.

Figure 4:
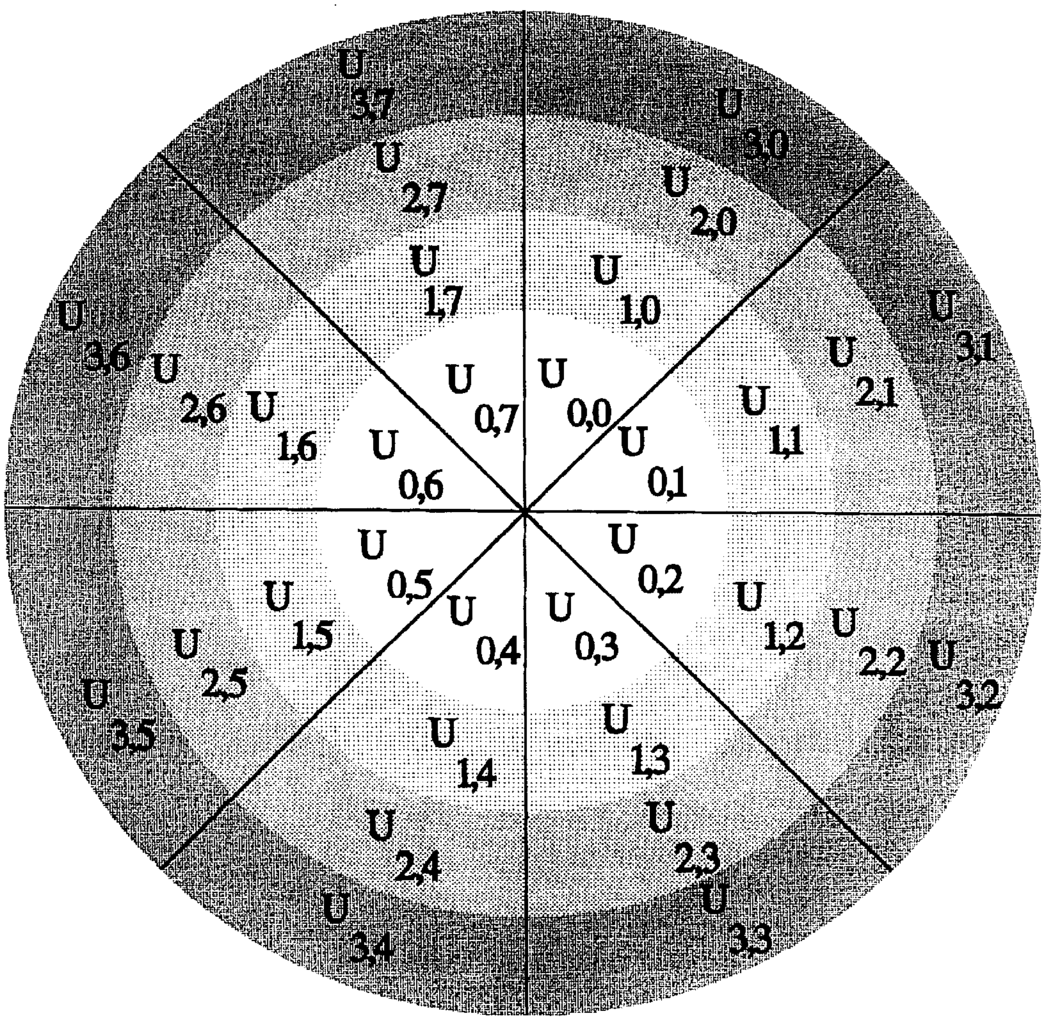
FIG. 4 depicts a discrete user domain where θ=π/four modeling four sampling time step radii.
Figure 5:
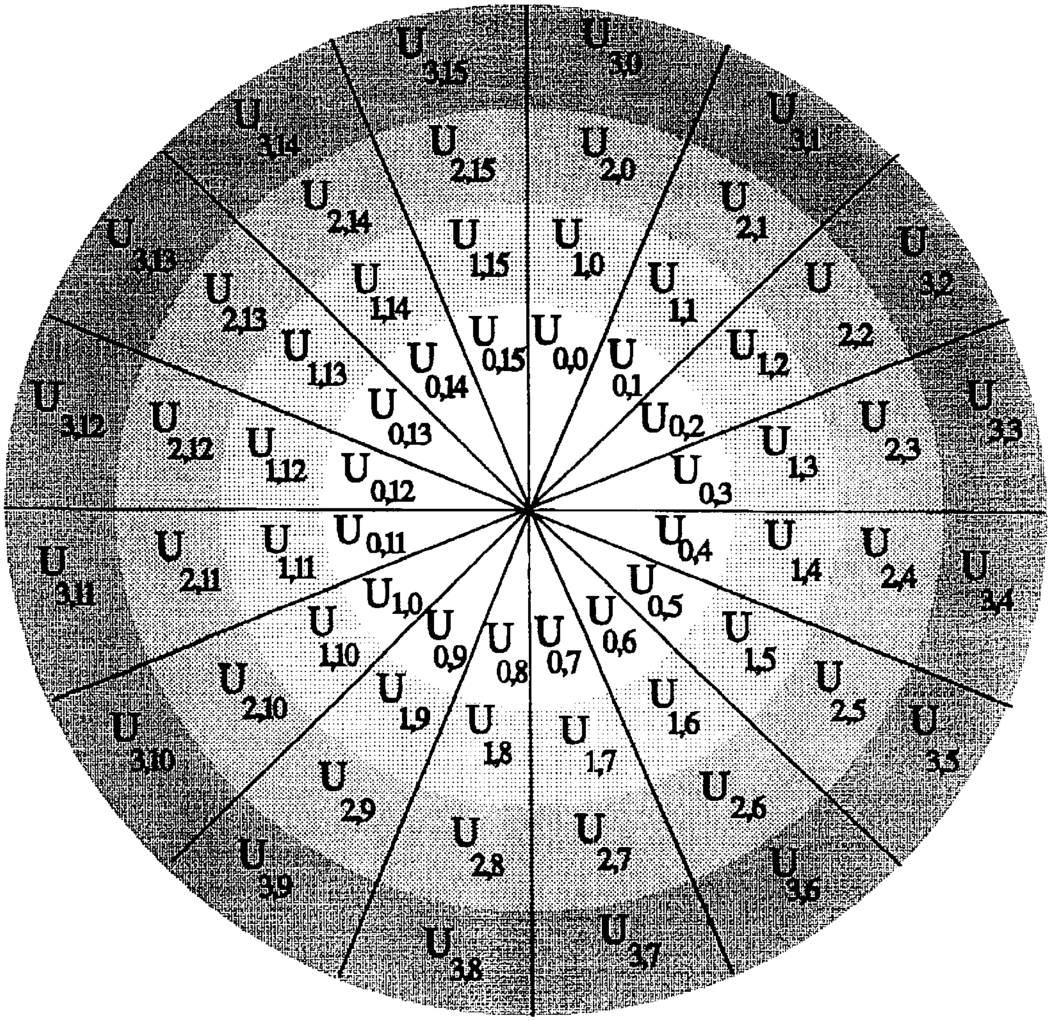
FIG. 5 depicts a discrete user domain where θ=π/eight modeling four sampling time step radii.

Discrete models of the uplink user transmission domain (FIGS. 4 and 5):

FIGS. 4 and 5 shows two discrete models of the user domain in said coordinate system. In FIG. 4, $\theta=\pi/4=2\pi/8$. Four layers of sampling are shown, corresponding to 5 time steps removed from current time, due to the time to propagate. In FIG. 5, $\theta=\pi/8=2\pi/16$. Five layers of sampling are shown, corresponding to six time steps removed from current time, due to the time to propagate.

Let us generalize the situation discussed in these two figures: Assume that the user transmission domain is discretely partitioned into $K_uL_uN_u$ areas where

- $K_u$ is the radial distance units in signal propagation of time step duration in the communication medium before the signal is too weak to be received.
- $N_u$ is the number of directional antenna components in the claimed 2-D array embodiment
- $L_u$ is an integer where $\theta=2\pi/L_uN_u$.

Let U[t,j,k] be the state of the discretized uplink user transmission domain at time step t, radius jcΔT polar coordinate kθ.

where

- t is a discrete value, assumed to be integer
- k ranges from 1 to $L_uN_u$.
- j ranges from 0 to $K_u-1$.
- c is the propagation rate in the communicating medium, which is assumed constant in this discussion.
- ΔT is the sampling time step.

Note that this analysis assumes that only a scalar such as signal strength is being described at U[t,j,k]. In some preferred embodiments, more sophisticated assumptions are optimal. However, the basic discussion outlined here will remain applicable, though the mathematics will become more complicated. Let Ru [i,t] be a vector of received uplink sampled states for antenna component i, where i ranges from 1 to $N_u$ at discrete time step t.

In certain preferred embodiments, Ru[i,t] can be the sampled state of a collection of filters, including but not limited to bandpass, sub-band and discrete wavelet based filters.

In certain preferred embodiments, Ru[i,t] can be the sampled states of a multiplicity of specific radiating elements within the radiating component(s) of each said directional antenna component. These sampled states may be further modified by phase alignment and signal combining techniques which are known in the art.

It can be seen that each sampled state of said directional antenna components is modeled as a linear function of the user transmission domain state generated in the past. This is due to the finite propagation speed of the communicating medium.

Consider the attenuation contour map 3. Each directional antenna component receives a time-displaced contribution from each user transmission domain component. This can be approximated by a linear combination of the time-displaced contributions of said discrete user transmission domain components. Let Au[i,j,k] be the linear contribution factor for antenna component i, from time-displaced user component jcΔT at polar coordinate kθ. Thus the contribution to Ru[i,t] by U[t−j, j, k] is scaled by Au[i,j,k]. Note that each Au[i,j,k] component is a vector of the same size as Ru[i,t]. Thus the matrix A can be seen as a 4-D matrix of real numbers, which may reasonably be embodied as floating point numbers and in many cases approximated further as fixed point numbers.

Given the above discussion, we can assume the following linear equation system approximately describes the relationship between the discretized user transmission domain and the reception state vector of the claimed antenna arrays:

$$Ru[i,t] = \sum_{j=1}^{K_u} \sum_{k=1}^{L_uN_u} Au[i,j,k]U[t-j,j,k]$$

$$= \sum_{j=1}^{K_u} \sum_{k=1}^{L_uN_u} Au[i,j,k]U[t-j,j,k]$$

The question at hand becomes how to extract information about U from knowledge of Au and Ru. Linear Algebra teaches us readily that the system of linear equations above can only be solved if there are as many terms Ru as there are terms Uu.

This condition will be met if there are $K_uL_u$ linearly independent samples and/or quantities taken or derived from each sampling time step at each directional antenna component. The following considerations will be relevant in a broad class of preferred embodiments:

- There could be $K_uL_u$ such filter banks for each of the $N_u$ said directional antenna components.
- Thus Ru[i,t] would be a vector with $K_uL_u$ components $Ru_a$[i,t].
- The above equation system is an FIR(Finite Impulse Response) filter system.
  - FIR's form banded linear transformations, in that multipliers Au[i,j,k] occur at offset locations in each subsequent time step's linear transformation between the user transmission states and the reception state matrix(filtered sub band samples by antenna component) of the antenna array.
  - Given certain conditions well documented in the mathematical disciplines regarding such systems, inverse linear transformations, also FIR's, exist and are numerically stable.

Such an inverse transformation would have the form $$U[t,j,k] = \sum_{c=1}^{N_u} \sum_{b=1}^{N_u} \sum_{a=1}^{K_uL_u} Bu[a,b,c;j,k]Ru_a[b,c+t]$$

A Linear Discrete Model of the downlink transmission and reception:

Let us now consider the downlink transmission model. Assume that the downlink reception domain is discretely partitioned into $K_dL_dN_d$ areas where $K_d$ is the radial distance units in signal propagation of time step duration in the communication medium before the signal is too weak to be received.

$N_d$ is the number of directional antenna components in the claimed 2-D array embodiment $L_d$ is an integer where $\theta=2\pi/L_dN_d$.

Let D[t,j,k] be the state of the discretized downlink user reception domain at time step t, radius jcΔT polar coordinate kθ.

where t is a discrete value, assumed to be integer k ranges from 1 to $L_dN_d$.

j ranges from 0 to $K_d-1$.

c is the propagation rate in the communicating medium, which is assumed constant in this discussion.

ΔT is the sampling timestep.

Note that this analysis assumes that only a scalar such as signal strength is being described at D[t,j,k]. In some preferred embodiments, more sophisticated assumptions are optimal. However, the basic discussion outlined here will remain applicable, though the mathematics will become more complicated. Let Td[i,t] be a vector of transmitted downlink sampled states for antenna component i, where i ranges from 1 to $N_u$ at discrete time step t.

In certain preferred embodiments, Td[i,t] can be the modulation frequency components.

It can be seen that each sampled state of said directional antenna components is modeled as a linear function of the user transmission domain state generated in the past. This is due to the finite propagation speed of the communicating medium.

Consider the attenuation contour map 3. Each directional antenna component receives a time-displaced contribution from each user transmission domain component. This can be approximated by a linear combination of the time-displaced contributions of said discrete user transmission domain components.

$$D[t,\ j,\ k] = \sum_{c=1}^{K_d} \sum_{b=1}^{N_d} \sum_{a=1}^{K_dL_d} Bd[a,\ b,\ c;\ j,\ k]Td_a[b,\ t-c]$$

Several important things need to be noted:

The a indexed terms account for channel interference.

The b indexed terms account for other-transmitting antenna interference.

The c indexed components account for multi-path contributions.

Typically, there will be a limited number of c indexed terms which are large.

Figure 6:
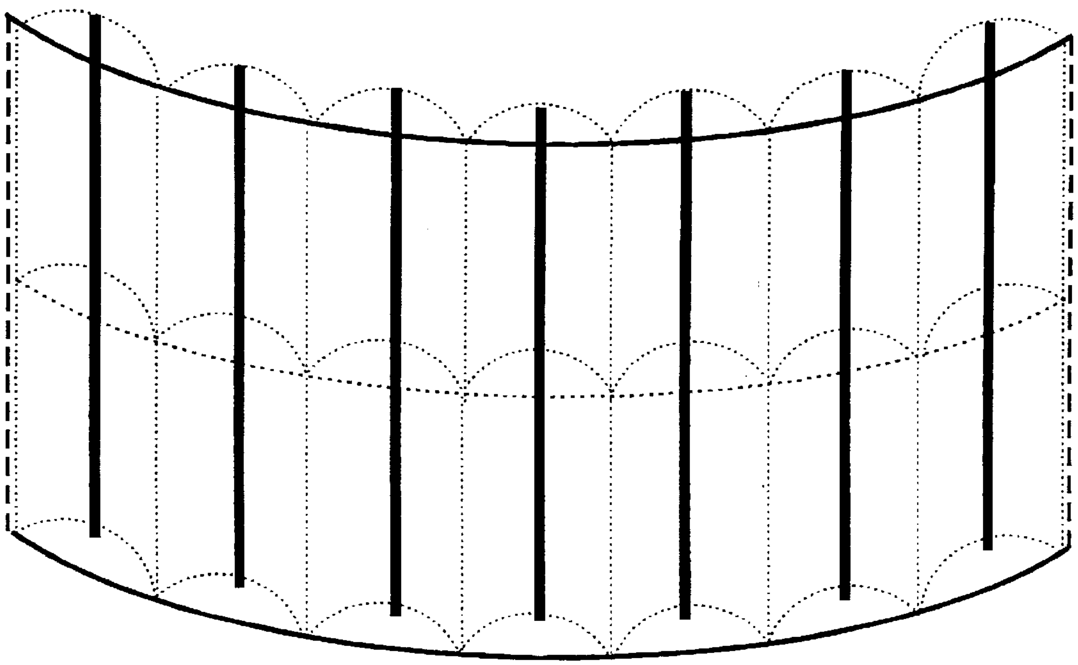
FIG. 6 depicts a stacked circular directional antenna array embodiment.

FIG. 6: Stacked Circular Directional Antenna Array

FIG. 6 depicts a portion of a preferred embodiment wherein essentially two or more embodiments of the circular directional antenna array disclosed in FIG. 1 are "Stacked" one on top of the other. This can also be seen as a directional antenna array covering a cylinder, which is a convex shape.

Certain preferred embodiments will consist of the top circular directional antenna array being used exclusively for transmission and the other circular directional antenna array being used for reception. Certain preferred embodiments will consist of the top circular directional antenna array being used exclusively for reception and the other circular directional antenna array being used for transmission.

Certain preferred embodiments will consist of alternative elements of each circular directional antenna array being used for transmission and reception. Certain preferred embodiments will further consist of the directional antenna components which are vertically adjacent being alternately for reception and transmission.

Certain preferred embodiments will consist of essentially identical antenna geometries, whereas other preferred embodiments will utilize distinct directional antenna components for transmission as opposed to reception.

Wireless Multi-media Distribution Problem

Spread Spectrum Background

Spread spectrum is a term which relates to "spreading" a message channel communicating at $R_b$ bits/sec through a modulation scheme to a signal of $W_{ss}$ Hz bandwidth, where $W_{ss}>>R_b$ is assumed.

It is commonly assumed (see page 5, Section 1.3 "Spread Spectrum Principles", in *CDMA: Principles of Spread Spectrum Communications*, by Andrew J. Viterbi, and page 153, "Spread Spectrum Communications" by L. B. Milstein and M. K. Simon in *The Mobile Communications Handbook*, ISBN 0-8493-8573-3) that background or thermal noise can be considered insignificant compared to additive noise from other sources, such as jamming devices or other users.

Assume $K_u$ users active at one time. Further assume each user employs a modulator over the same frequency band which approximates additive Gaussian noise. Further assume all said users are received at power level $P_s$ watts. This leads to an assumed other source additive interference power I, which each user perceives at its demodulator of $I=(K_u-1)P_s$. The noise density received by received by each of said demodulators is $I_0=I/W_{ss}$.

Further assume that each said users demodulator can operate against Gaussian background noise at a bit-energy-to-noise-density level of $E_b/I_0$. The bit-energy is the received power divided by the bit rate, i.e. $E_b=P_s/R_b$. So that for a given bit-energy-to-noise-level we have $$\frac{E_b}{I_0} = \frac{\frac{P_s}{R_b}}{\frac{I}{W_{ss}}} = \frac{P_s}{R_b}\frac{W_{ss}}{(K_u-1)P_s} = \frac{W_{ss}}{R_b(K_u-1)}$$

This equation can be found in slightly different forms in both recently cited references (see page 6, equation (1.4), Section 1.3 "Spread Spectrum Principles", in *CDMA: Principles of Spread Spectrum Communications*, by Andrew J. Viterbi, ISBN 0-201-63374-4 and page 153, equation (11.3), "Spread Spectrum Communications" by L. B. Milstein and M. K. Simon in *The Mobile Communications Handbook*, ISBN 0-8493-8573-3).

There are several spread spectrum modulation techniques: Code Division Multiple Access(CDMA, also known as Direct Sequence Spread Spectrum Modulation), Frequency Hopping Modulation and Time Hopping Modulation, as well as hybrids of these techniques. CDMA has been chosen as the mechanism for an important family of wireless communications systems throughout much of the world. The following discussion will focus upon CDMA. The claimed invention is however relevant and applicable to all forms of spread spectrum modulation technologies.

CDMA channels are spread across the entire bandwidth. They are each generated from specific codes.

CDMA implementations possess base stations and users. When a user is turned on, an automatic process of surveying accessible base stations is made. A similar procedure occurs as a user moves. The user will select one base station based upon its received power and its clarity.

The NII multimedia distribution problem

The U.S. government has recently allocated 300 MHz to NII (National Information Infrastructure) transceiver usage at approximately 5.6 GHz. The stated target applications include neighborhood distribution of multi-media such as Video On Demand and Movies On Demand. Both applications require sustained downlink bandwidth of 4–6 MHz per user. The uplink bandwidth is statistically very small per user and for the moment will not be considered.

The discussion which follows will be based upon a CDMA spread spectrum approach. However, similar arguments could be made for other spread spectrum and none spread spectrum protocols. The invention disclosed herein includes but is not limited to any of these protocols. It application would be embodied in a similar fashion for any of them.

Assume 6 MHz per user sustained bandwidth is required for an active user. Further, assume that 6 db is required for bit-energy-to-noise-density level of $E_b/I_0$ for acceptable demodulation reliability. This puts $K_u$ at approximately 12 active users. If we further assume that the coverage pattern will permit 75% of the total users (which could then number 16) to be active at this bandwidth and if all the users are active, the bandwidth allocation goes to 4 MHz, a pattern emerges of the kind of downlink distribution system that can be supported.

Uplink communications per user is likely to run between 32K and 128K bits/sec, based upon voice links being about 32K bits/sec and video phones being between 64K and 128K bits/sec using existing compression technology.

Since an urban apartment complex may well have up to 30 floors and be as wide as a city block, there would be far more potential users than channels. Channel reuse is a requirement to implement wireless multimedia and other LAN/internet systems in such user environments.

Communication systems supporting applications of this kind will then have several features in common:

- Very disproportionate downlink to uplink bandwidth requirements, with
  - the downlink being on the order of 4–6 MHz and
  - the uplink being on the order of 36–128 Kbits/sec.
- Distribution mechanisms in urban areas will see a need for significant channel reuse to cover large multi-story dwellings.

Figure 7:
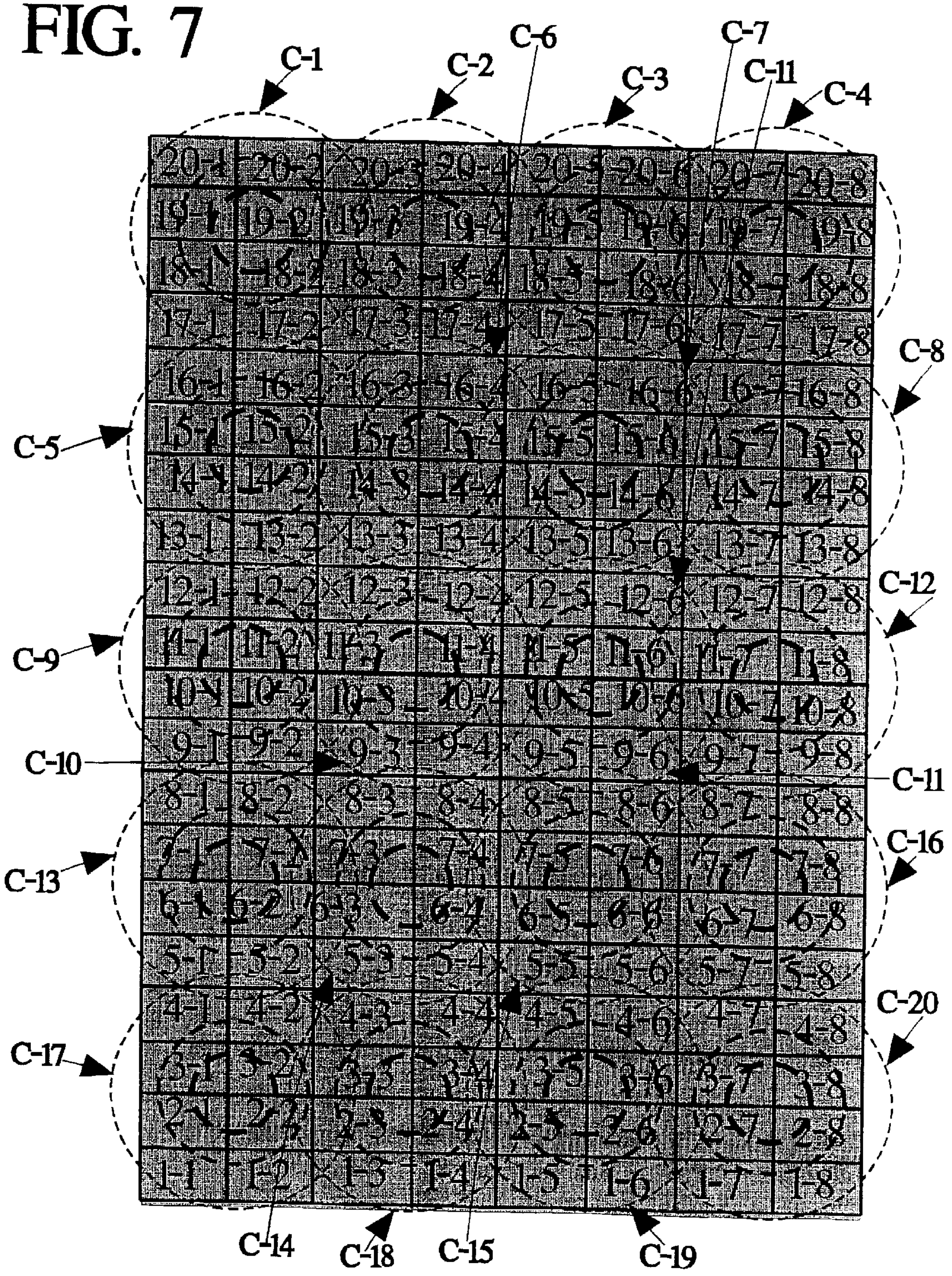
FIG. 7 depicts a schematic apartment house coverage scheme showing a primary attenuation lobe contour map.

FIG. 7: Coverage pattern for a typical apartment house showing primary attenuation lobe contour map for multi-media downlink system Consider FIG. 7. It depicts a typical 20 story urban high rise dwelling such as is found in high density urban sites around the world. Assume that the floors are every 3 meters. Further assume that there is a multi-media user/subscriber located every 5 meters on each floor of the face of the building.

What is being proposed is covering the building with an array of directional antenna components such that the contour maps of the primary attenuation lobes for a pattern as shown in this figure.

C-1 to C-20 represent contour maps of the primary attenuation lobes of distinct downlink antenna components of claimed directional antenna arrays. The three concentric circles illustrate 3 db contour lines of the primary attenuation lobe. The innermost circle is darker, indicating it is the strongest. Note that this figure is symbolic and is not meant to show all details, but rather to illustrate the principles being claimed.

The users are shown in the figure in 20 story apartment building facing the antenna array. In this depiction, there are 8 users per floor facing the antenna array. A user on floor 15 in apartment 3 is designated 15-3.

Each user is thus covered by one or more primary attenuation lobes wither where one primary lobe is strong enough to contain to the entirety of the signal needed for reception at the user site or alternatively, more than one antenna component will need to broadcast a user sites signal for proper signal strengths upon receipt.

In certain preferred embodiments, calibration signals may be transmitted by one or more of the downlink antenna components. These signals would be received by a standard receiver on the targeted user domain and then fed back to said claimed antenna array to provide a means of controlling the power so that in cases where attenuation varied due to climate(rain, fog, etc.) the power levels could be adjusted. This is particularly relevant in certain frequencies where under certain climatic and other conditions the absorption of the intervening media varies significantly.

Ball Antenna Array (FIGS. 8 to 13)

Overview:

- The surface of a convex shape (in this case a sphere or hemisphere) is covered by a collection of directional antennae.
- For simplicity sake, the drawings and discussion that follow will be limited to embodiments of parabolic directional antenna as in A of FIG. 2. This is done only to simplify the document, there are comparable advantages to be found in using the other disclosed antenna components, as well as directional helical antennas.
- Note that in the following disclosed antenna arrays, certain preferred embodiments may be composed as follows:
  - All directional antenna components are transmitting downlink antennas.
  - Some directional antenna components are transmitting downlink antennas and some are receiving uplink antennas. In such circumstances, various patterns of use include but are not limited to:
    - rectangular and hexagonal patterns of usage mapped onto the covered surface.
    - alternating rows/columns
    - alternating elements in rows and columns FIG. 8 discloses a hemisphere H which has been covered on one side by a collection of directional antennae A.

One preferred embodiment incorporates the antenna feeds being merged into a cable or conduit C. In certain preferred embodiments, initial signal processing including but not limited to sampling, filter, amplification, down conversion and phase alignment signal processing by additional circuitry may be optimally performed physically proximate to one or all of said directional antenna components or within the interior of said hemisphere. In such situations, the cable or conduit C would carry not only the processed signals out of the device, but may also carry signals into the device. The purpose of these signals may include but is not limited to controls directing the signal processing circuitry. Note that these preferred embodiments are relevant to all claimed embodiments disclosed herein. This paragraphs discussion will not be repeated again for brevity, but is to be assumed for each disclosed directional antenna array.

In this and the following figures, the embodiments will assume that the base location vectors of all said directional antenna components are proximate to the boundary of the convex shape. These directional antenna components are all approximately the same size.

Figure 9:
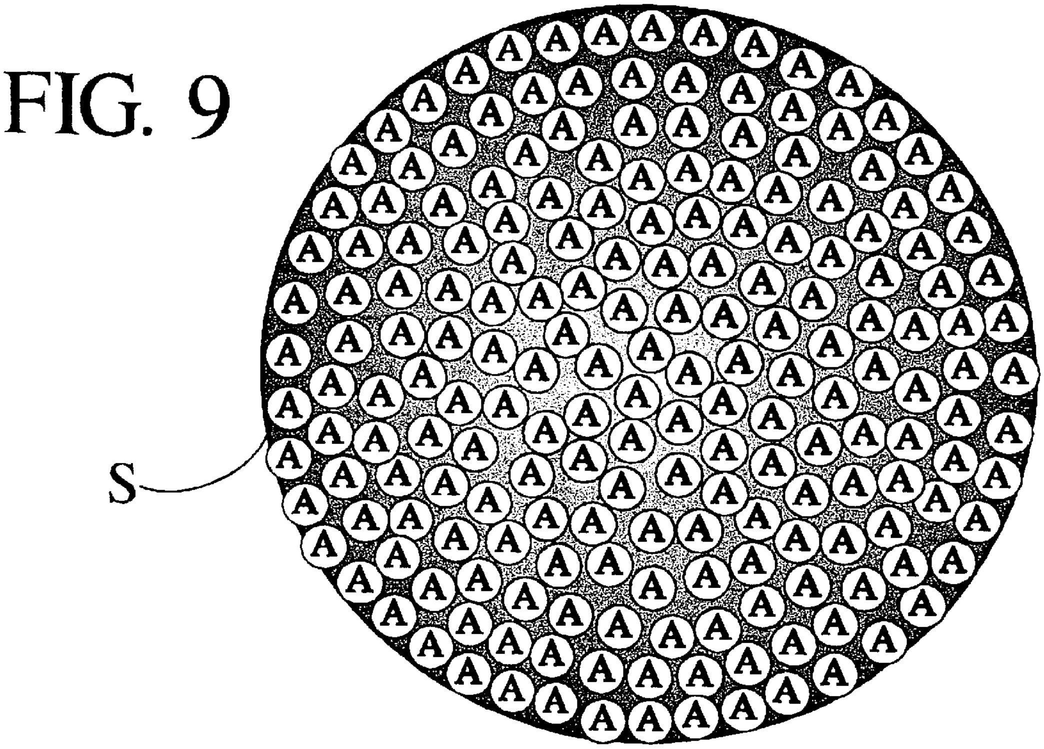
FIG. 9 depicts a Sphere covered by a collection of directional antennae.

FIG. 9 discloses a sphere S which has been covered on one side by a collection of directional antennae A. These directional antenna components are all approximately the same size.

Figure 8:
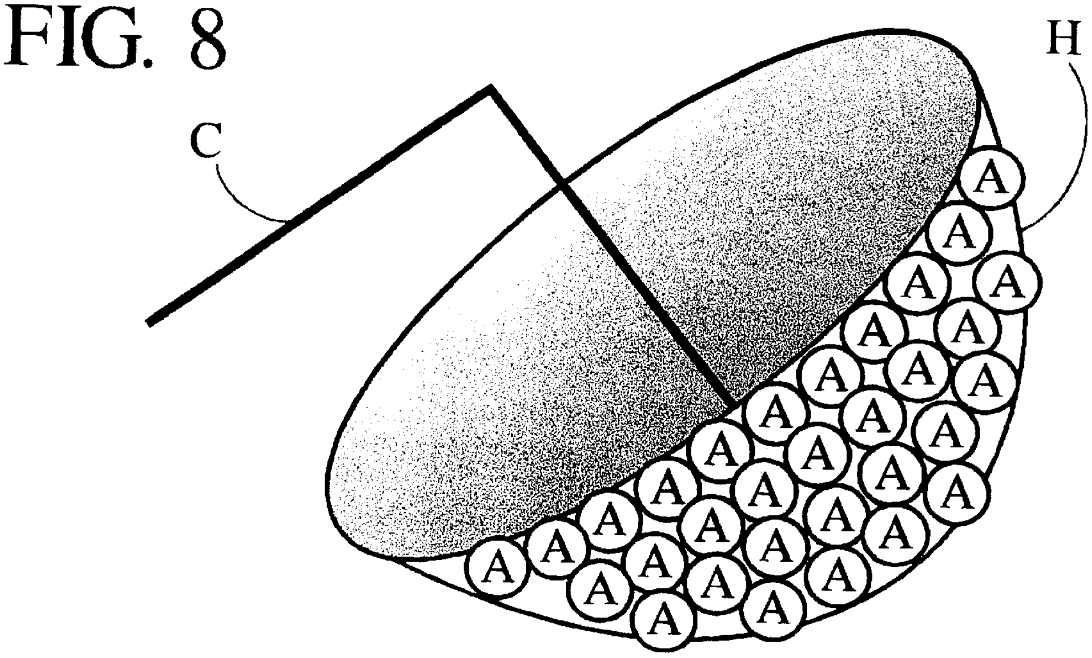
FIG. 8 depicts a hemisphere covered on one side by a collection of directional antennae.
Figure 10:
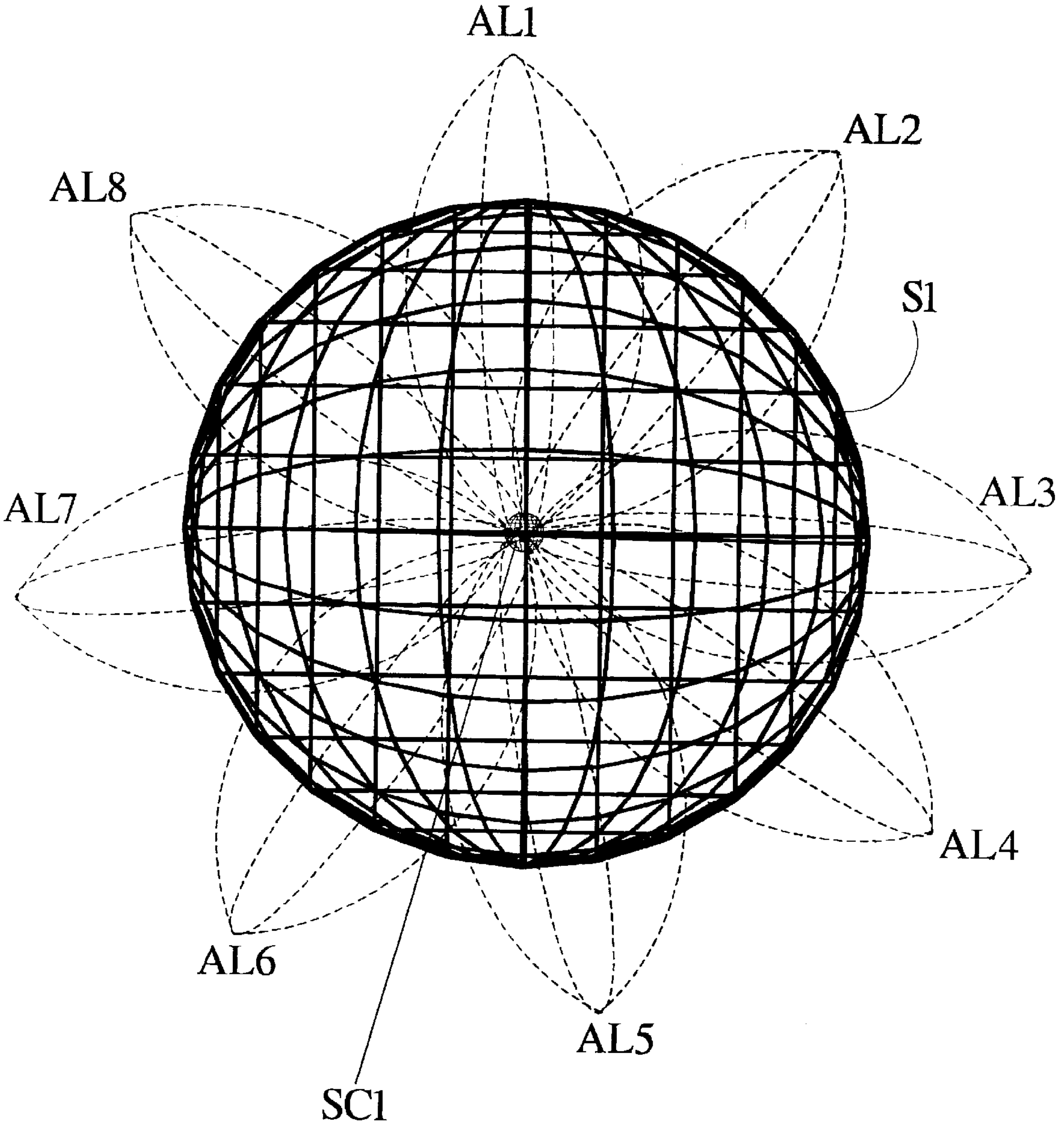
FIG. 10 depicts a partial schematic figure showing some of the primary attenuation lobes of directional antenna arrays as in FIGS. 8 and 9.

FIG. 10 schematically disclosed a portion of the primary attenuation lobes of the directional antenna components of FIGS. 8 and 9.

Note that only the primary attenuation lobes of said antenna components in the plane parallel to the viewing plane have been drawn.

This has been done to limit the complexity of the drawing and to represent that the attenuation nodes in fact pervade 3-dimensional regions.

Note that in specific applications, an embodiment of the mathematical systems analysis found after FIGS. 4 and 5 can be developed. It will be significantly more complicated, but hat the fundamental issues will be similar.

Figure 11:
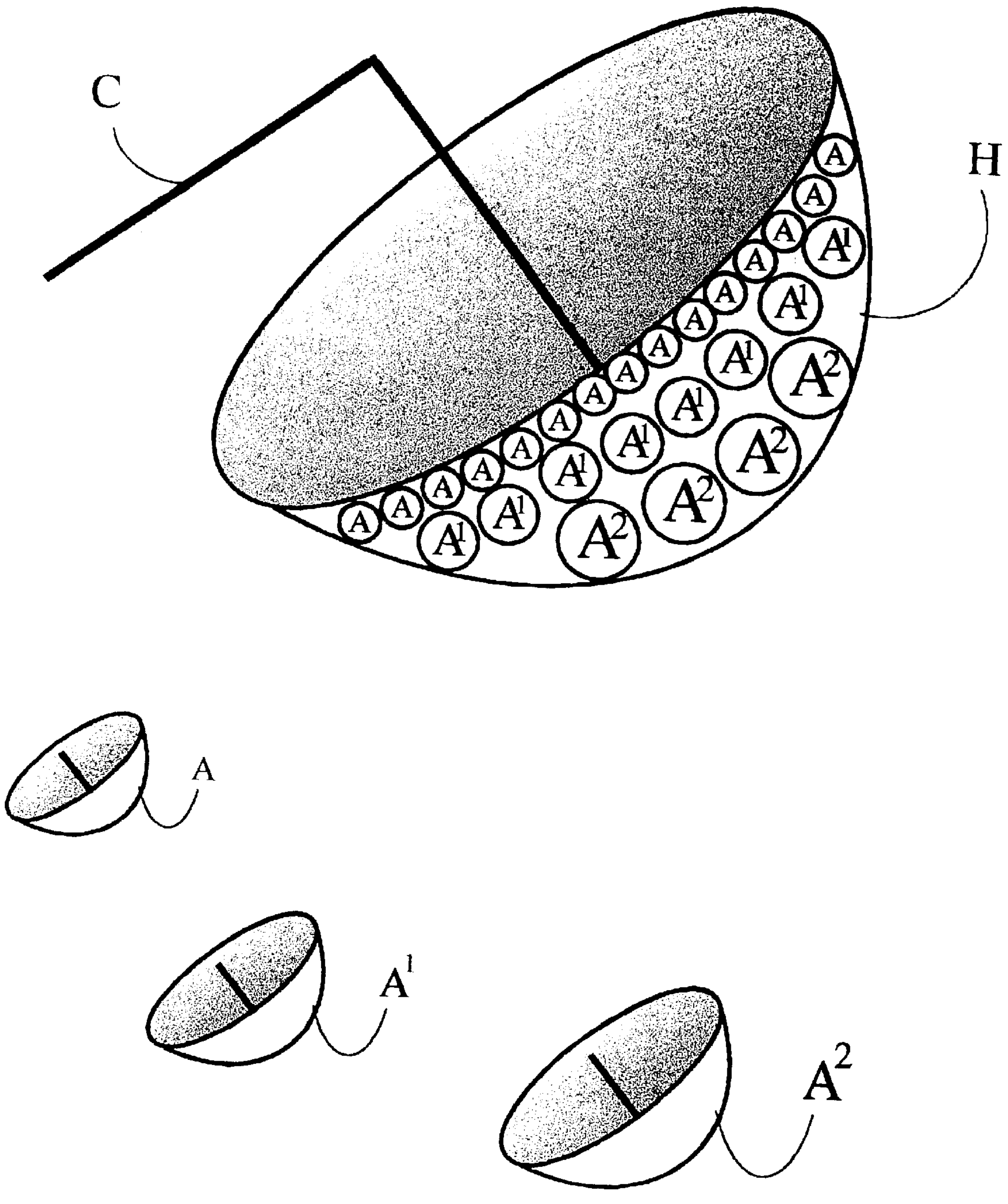
FIG. 11 depicts a hemisphere H proximately covered by a multiplicity of direction antennae of more than one aperture size.
Figure 12:
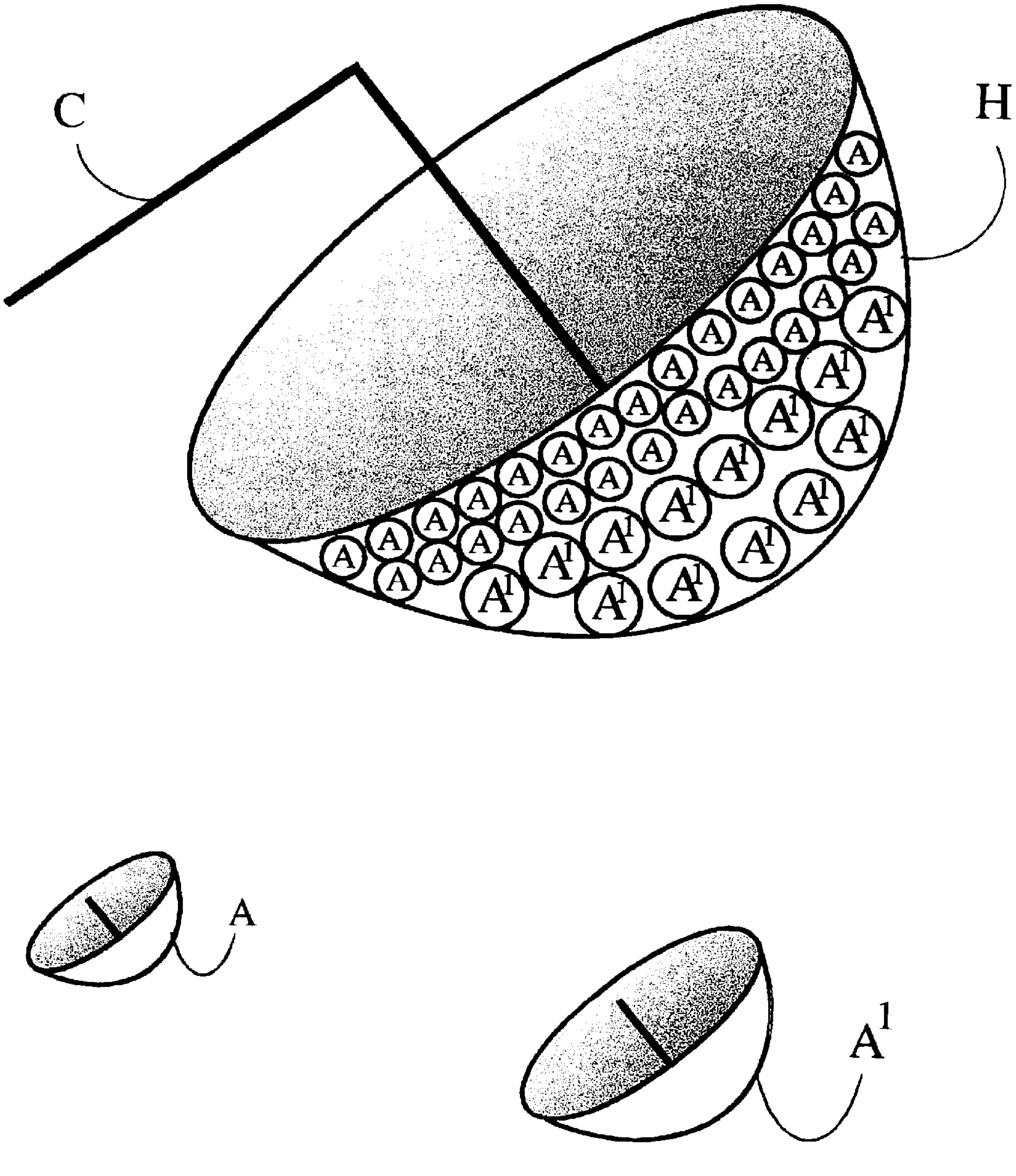
FIG. 12 depicts a hemisphere H proximately covered by a multiplicity of direction antennae of more than one aperture size.
Figure 13:
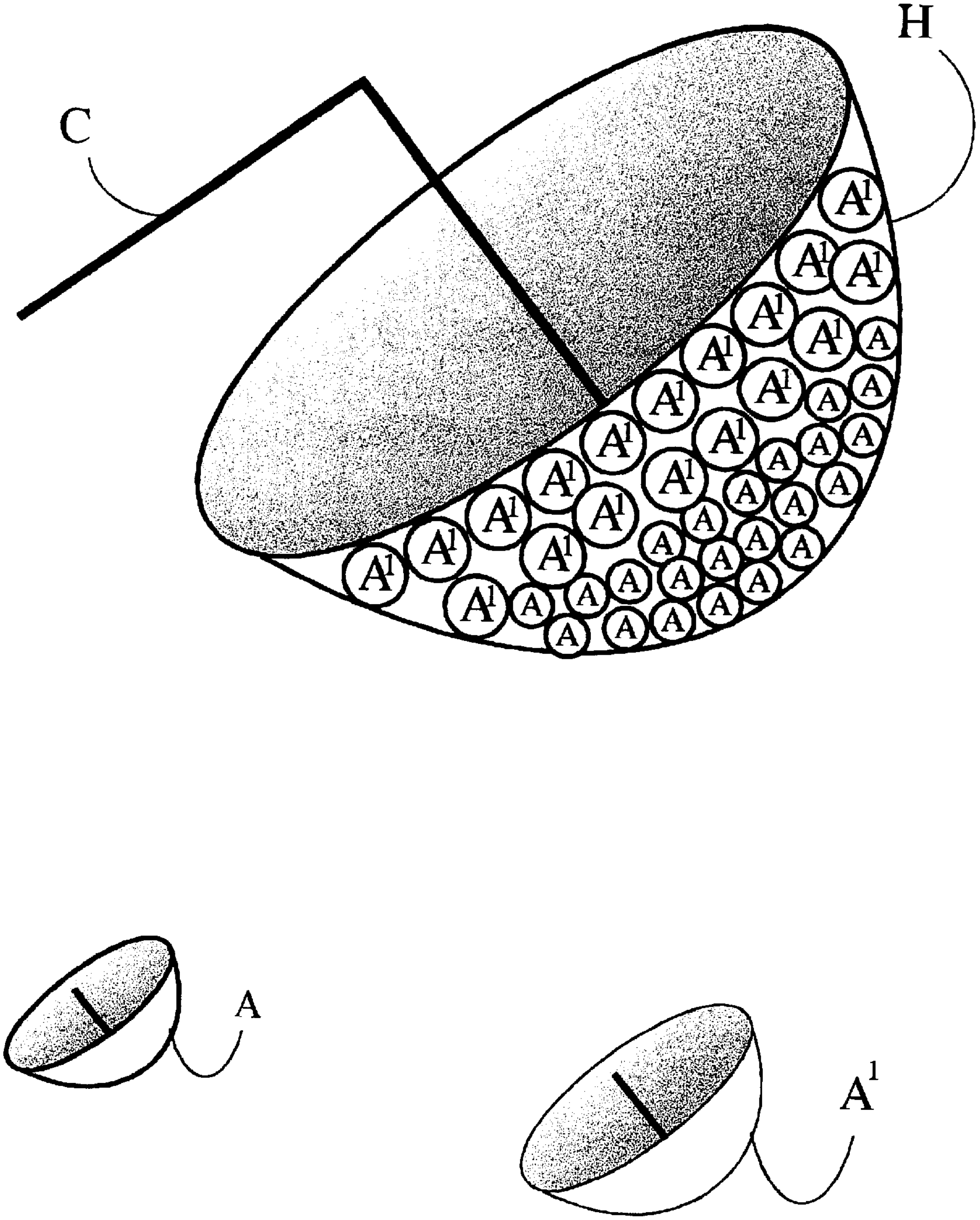
FIG. 13 depicts a hemisphere H proximately covered by a multiplicity of direction antennae of more than one aperture size.

FIGS. 11, 12 and 13 disclose a hemisphere covered by directional antenna components of various sizes.

Note that comparable embodiments covering a complete sphere as well as covering portions of a sphere other than exactly a half-sphere may be preferable in certain applications.

However, the discussions are similar enough that they can be reasonably inferred by one skilled in the art given the enclosed discussion and as such have not been incorporated.

Discussion herein will be limited to hemispheres but are not meant to in any way exclude other such embodiments.

Note that in the following disclosed antenna arrays, certain preferred embodiments may be composed as follows:

All directional antenna components are transmitting downlink antennas.

Some directional antenna components are transmitting downlink antennas and some are receiving uplink antennas. In such circumstances, various patterns of use include but are not limited to:

rectangular and hexagonal patterns of usage mapped onto the covered surface.

alternating rows/columns alternating elements in rows and columns

FIG. 11 embodies a hemisphere H proximately covered by a multiplicity of direction antennae of more than one aperture size.

Specifically, antenna components A, a[1] and A[2] possess distinct aperture sizes.

Note that the largest apertures near the middle of the hemisphere and that the aperture sizes diminish in a progressive fashion toward the perimeter of the covered surface.

This provides more primary attenuation lobes toward the plane of the covered surfaces perimeter plane, which can be advantageous in applications requiring increased resolution in those directions.

FIG. 12 alternatively embodies a hemisphere H proximately covered by a multiplicity of direction antennae of more than one aperture size.

Specifically, antenna components A and A[1] possess distinct aperture sizes.

Note that the largest apertures near the middle of the hemisphere and that the aperture sizes diminish in a progressive fashion toward the perimeter of the covered surface.

The distinctive feature in this embodiment is that there are multiple rows of each size.

This can be advantageous in applications requiring increased resolution in those directions and constrained processing capability.

FIG. 13 alternatively embodies a hemisphere H proximately covered by a multiplicity of direction antennae of more than one aperture size.

Specifically, antenna components A and A[1] possess distinct aperture sizes.

Note that the largest apertures near the perimeter of the hemisphere and that the aperture sizes diminish in a progressive fashion toward the middle of the covered surface.

This provides more primary attenuation lobes away from the plane of the covered surfaces perimeter plane, which can be advantageous in applications requiring increased resolution in those directions.

Figure 14:
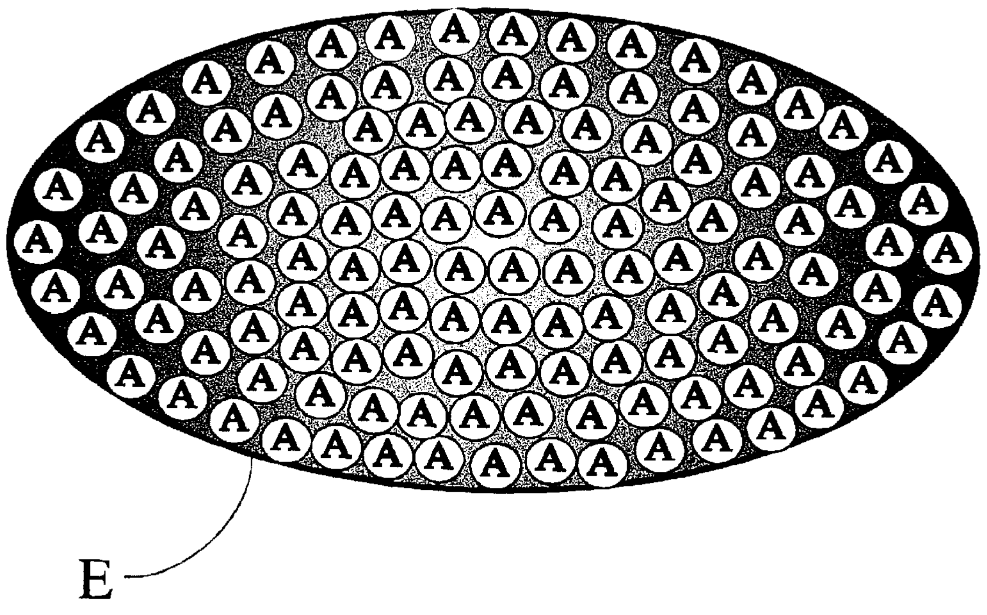
FIG. 14 depicts an ellipsoidal directional antenna array.
Figure 15:
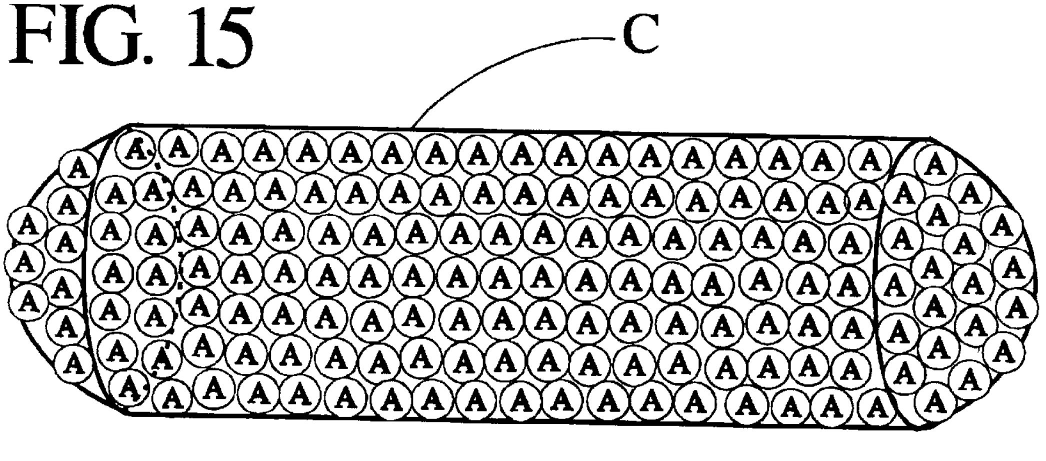
FIG. 15 depicts a cylindrical directional antenna array.

Ellipsoidal and Convex Ended Cylinder Directional Antenna Arrays(FIGS. 14 and 15)

Overview:

Two additional embodiments are discussed wherein the convex shapes involved are the ellipsoid and cylinder with convex ends.

There are other convex shapes which may well be preferred in various applications, including but not limited to, the regular solids (tetrahedron, cube, . . . , icosahedron), other convex polyhedrons (cube-octahedrons, etc.) and geodesic domes in 3-D as well as convex polygons and other continuous shapes in 2-D. These embodiments will not be developed here. This is done to limit the complexity of the discussion to central salient points.

As in the above discussion, there are other alternative embodiments incorporating the covering of part of said shapes. It will not be developed here. This is done to limit the complexity of the discussion to central salient points.

As in the above discussion, there are other alternative embodiments incorporating the covering of said shapes with directional antenna components of differing parameters, such as aperture sizes. These will not be developed here. This is done to limit the complexity of the discussion to central salient points.

Note that in the following disclosed antenna arrays, certain preferred embodiments may be composed as follows:

All directional antenna components are transmitting downlink antennas.

Some directional antenna components are transmitting downlink antennas and some are receiving uplink antennas. In such circumstances, various patterns of use include but are not limited to:

rectangular and hexagonal patterns of usage mapped onto the covered surface.

alternating rows/columns alternating elements in rows and columns

FIG. 14: Ellipsoidal directional antenna array

This preferred embodiment comprises an ellipse E proximately covered by a multiplicity of direction antennae A of one aperture size. Such embodiments possess non-uniform attenuation contour maps which can be advantageous in certain applications.

FIG. 15: Cylindrical directional antenna array

This preferred embodiment comprises a cylinder C whose ends have been extended with a convex shape, in this case, hemisphere. The surface of C has been proximately covered with directional antenna components A. These embodiments possess non-uniform attenuation contour maps which can be advantageous in certain applications.

Figure 16:
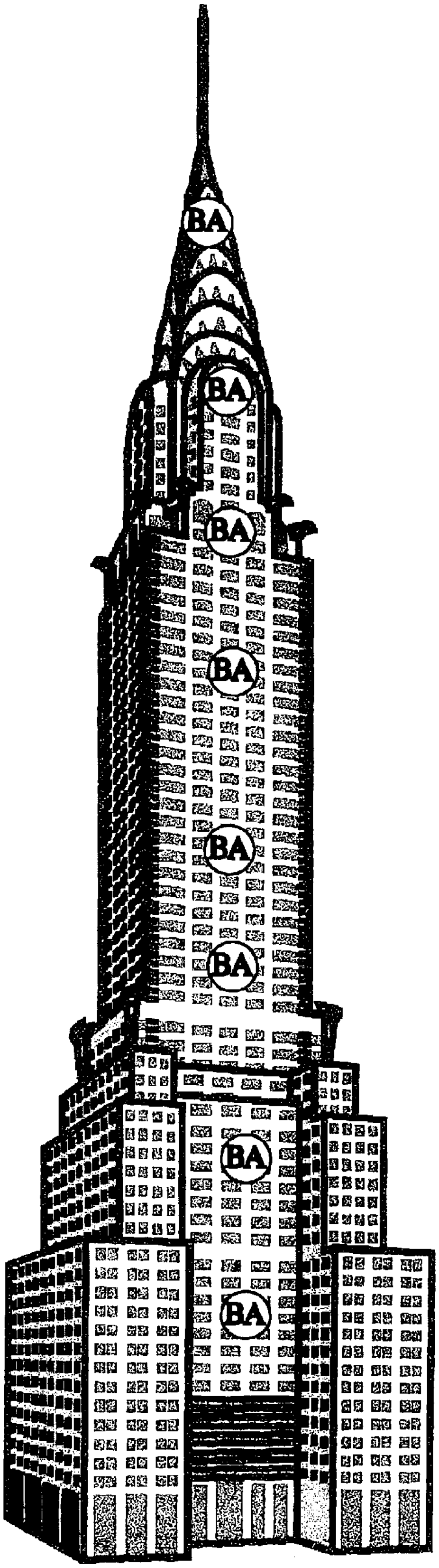
FIG. 16 depicts placement of a multiplicity of ball antenna arrays on a tall building.

FIG. 16 showing placement of a multiplicity of Ball Antenna Arrays on a tall building FIG. 16 depicts a tall building upon which a multiplicity of Ball Antenna Arrays have been attached to provide wireless multi-media downlink support. The figure specifically depicts the Chrysler Building in New York City, but it could just as easily be any other large building. The relative size of the ball antenna arrays is not in proportion to the building.

Directional Antenna Ring Array Application in Cellular Radio Base Stations (FIGS. 17 to 20)

Overview

Cellular base station embodiments of this invention offer significant advantages over conventional base station antenna sets (See references [3.a] and [3.b] regarding conventional base station antenna sets.)

Embodiments comprised of one or more omni-directional receiving antennas plus one or more of the directional antenna arrays as disclosed in this patent provide significant advantage when incorporated into the collector architecture of Cellular Telecom's zone manager/aggregator communications system architecture.

Note that certain preferred embodiments would incorporate various mixtures of transmitting and receiving antennas, not only in the interaction between the base station and the users, but also in the interaction between other base stations and higher levels of control and integration known variously as MTSO's and region managers.

Figure 17:
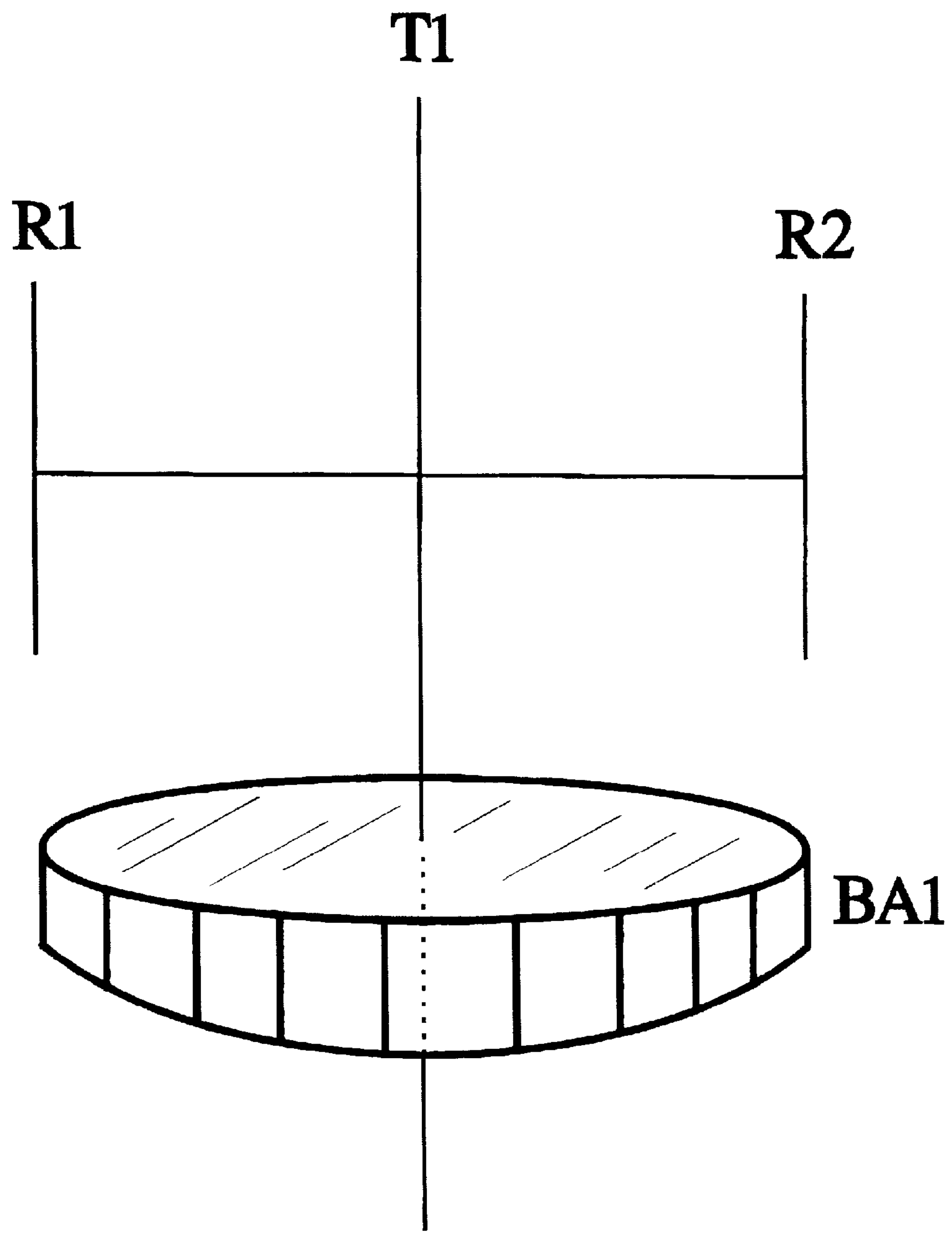
FIG. 17 depicts an improved antenna set for cellular base station.

FIG. 17: Improved Antenna Set for Cellular Base Station

One preferred embodiment in FIG. 14 incorporates a well known configuration of a transmitting antenna, a pair of omni-directional receiving antennae and a circular array of antennae as disclosed in FIG. 1.

Such embodiments have application in cellular base station designs. The design and configuration of an antenna set composed of the transmitting and dual omni-directional antennas in known in the art and well disclosed in references [3.a] and [3.b].

Certain preferred embodiments would vary the location of the circular directional antenna array so that they receiving and transmitting were not all approximately co-located. While these have relevance in certain applications, the discussion herein will focus on the embodiment sketched in the figure.

Certain preferred embodiments would best incorporate other disclosed directional antenna arrays. The notation "BA" used in this and the following diagrams will refer to any appropriate disclosed directional antenna arrays.

Figure 18:
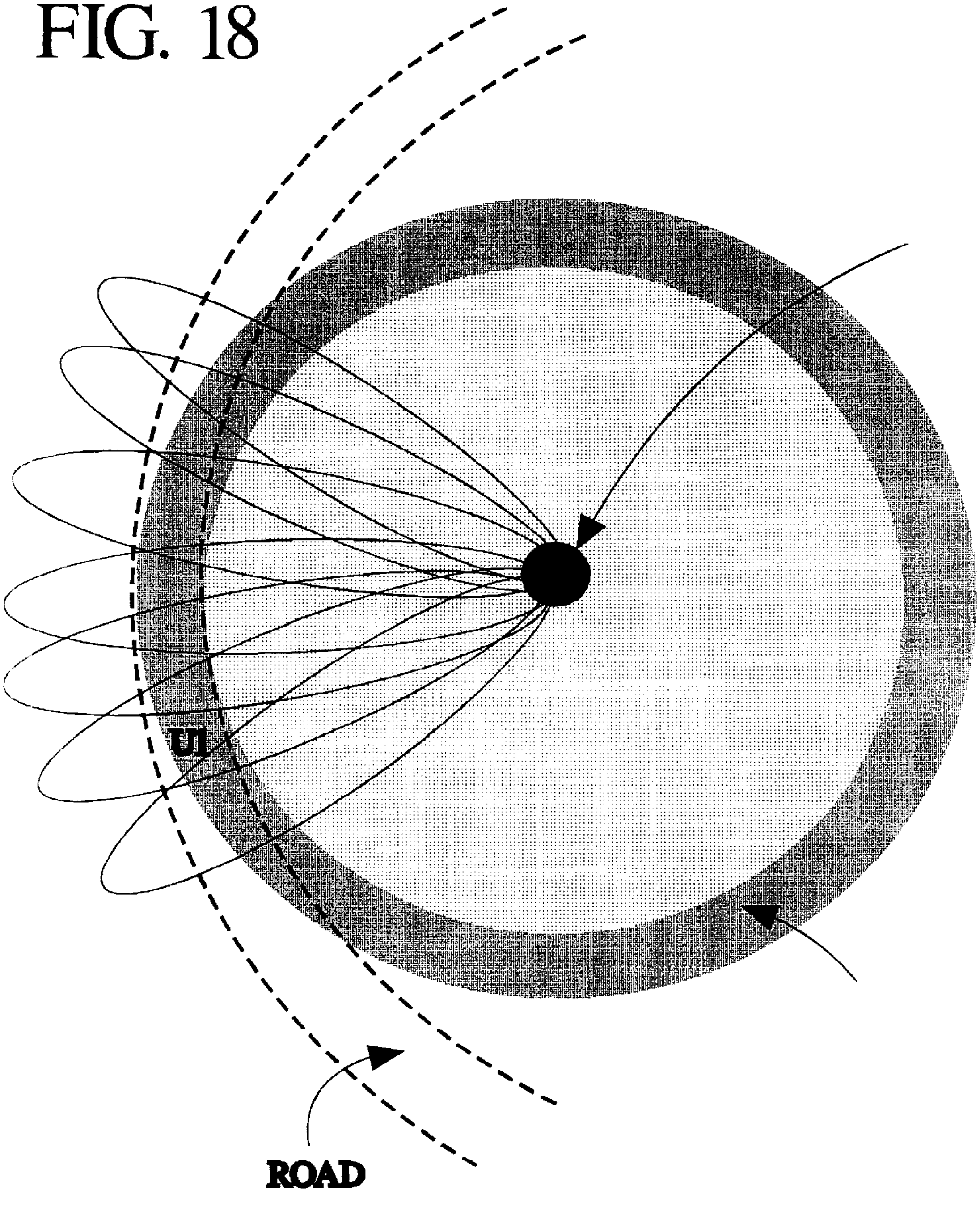
FIG. 18 depicts an application in a region possessing a major thoroughfare twisting through a mountainous region.

FIG. 18: Application in region possessing major thoroughfare twisting through mountainous region In this figure, a single base station is effectively covered a twisted road or freeway through what may well be a mountain gorge. This situation is found in many regions of the world, on practically every continent. The embodiment as in FIG. 14 preferred in this circumstance may well require a partial hemisphere covered with directional antenna components with possibly different aperture widths.

Such embodiments allow for the isolation of users traveling in various portions of the roadway based upon which primary attenuation lobes are being traversed.

Figure 19:
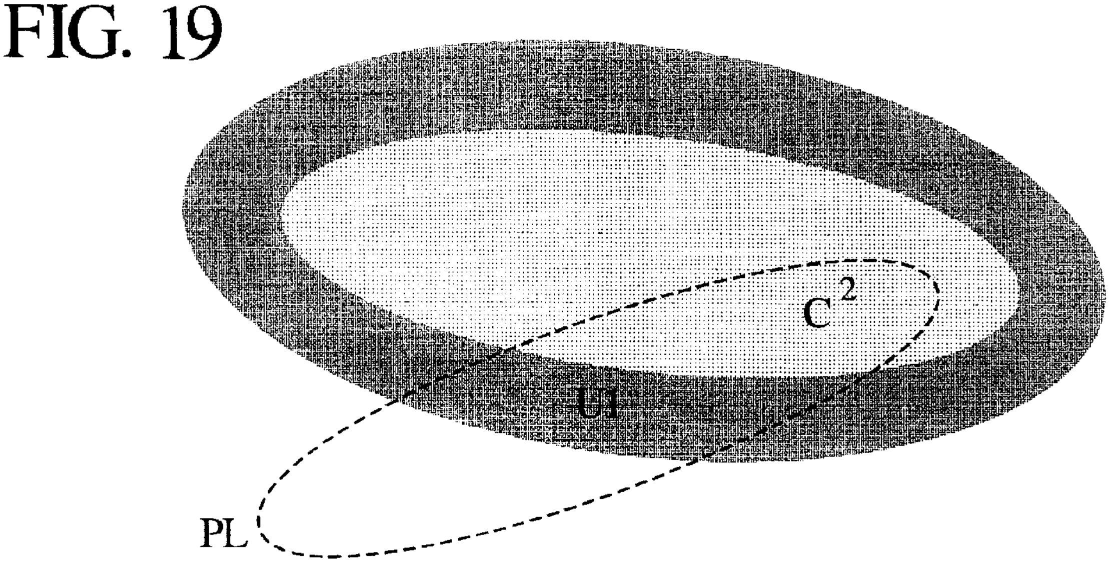
FIG. 19 depicts an augmentation of location finding capability over strictly omnidirectional receiving antenna set capability.

FIG. 19: Showing augmentation of location finding capability over strictly omnidirectional receiving antenna set capability.

Given a collector comprised of one or more co-located omni-directional receiving antennae for uplink reception, the best that can be done to determine the location of user U1 is an area bounded by ellipses wherein said region comprises the probable location of U1 based upon the delay of arrival of signal relative to some triggering signal emanating from a second source. The second source is at one focal point of the ellipses. The other focal point is occupied by the collector.

The effect of the addition of an embodiment of a disclosed directional antenna array is shown by superimposing the nearest primary attenuation lobe PL of the array. The intersection of the primary attenuation lob and delay of arrival location information significantly refines the location information which can be derived with one collector or base station of this sort.

Figure 20:
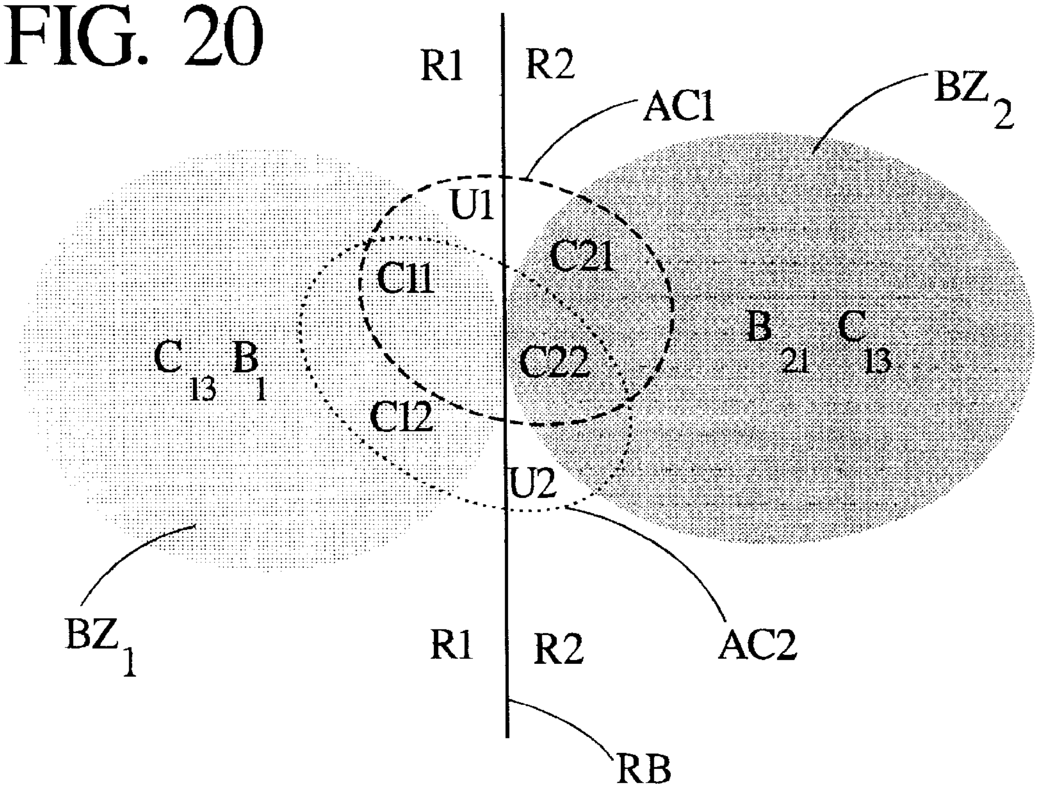
FIG. 20 depicts multiple spaced-apart collectors to facilitate hand-off and aggregation.

FIG. 20: Showing application of improved collector architecture to macro-diverse collector allocation for handoff between cellular zones FIG. 20 is a standard diagram showing the allocation of standard collector resources required to derive adequate location information during handoff between two cellular zones, possible of different cellular regions. This assumes that each said collector's uplink receiving antennae are omni-directional. In such a case, 3 different macro-diverse collectors are required to locate a user.

Assuming instead use of the disclosed preferred embodiments, each collector would be able to derive the relevant location information for a user. Handoff between zones could then be achieved by two collectors typically.

Figure 21:
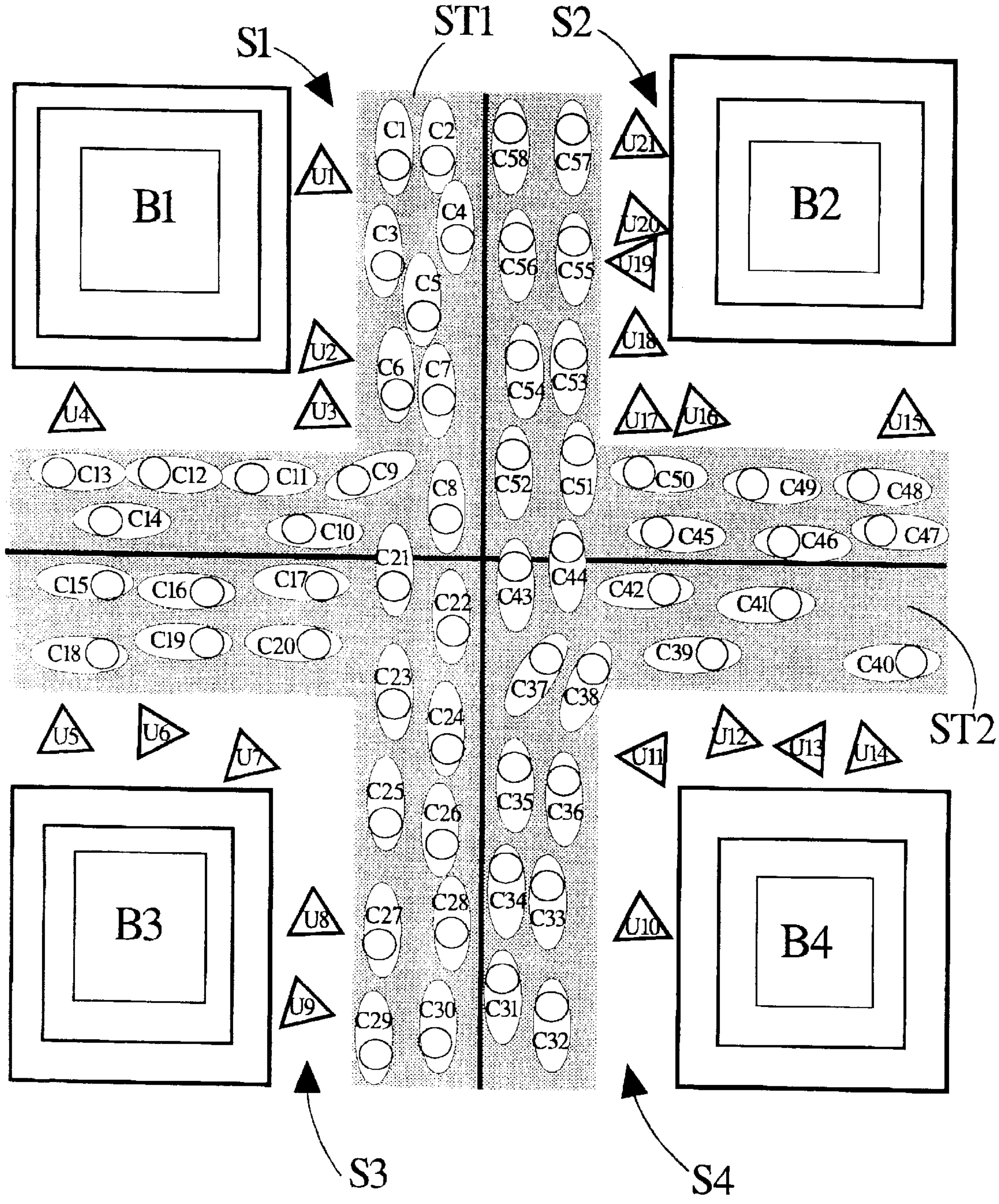
FIG. 21 depicts an overview of problem of user reception in densely concentrated areas users.

FIG. 21: Overview of problem of user reception in densely concentrated areas FIG. 21 is a simplified figure showing the basic terms of a problem found in many crowded locations. Depicted is an intersection of two streets ST1 and ST2 in an urban setting bordered by four large buildings B1–B4. Each building has a sidewalk which faces the street. The sidewalks are labeled S1 to S4. A small number of users U1–U21 are displayed walking on the sidewalks. A small number of cars C1–C58 are depicted traversing the streets ST1 and ST2.

Real application areas have large numbers of users and often (but not always) cars in close proximity. Specifics such as number, size, shape and geometric relationship between pedestrian thoroughfares, auto thoroughfares and buildings will vary widely. However, the central discussion remains the same.

Conventional omni-directional receiving antennae as well as "sectorized" directional antennas as disclosed in references [3.a] and [3.b] are unable to partition these users into cells which are small enough to be effectively processed. A set preferred embodiments will be disclosed next which supports that partitioning. In the Figures that follow, BA will stand for any preferred embodiment disclosed to this point in the patent. These embodiment will be referred to as Ball Antenna Arrays hereafter in the specification.

Multiple instances of the same or differing embodiments of the above invention may be preferred in specific applications.

The following discussion will use the phrase Ball Array to refer to any embodiment of the claimed inventions. This is being done to simplify the discussion and focus on the salient application information.

Figure 22:
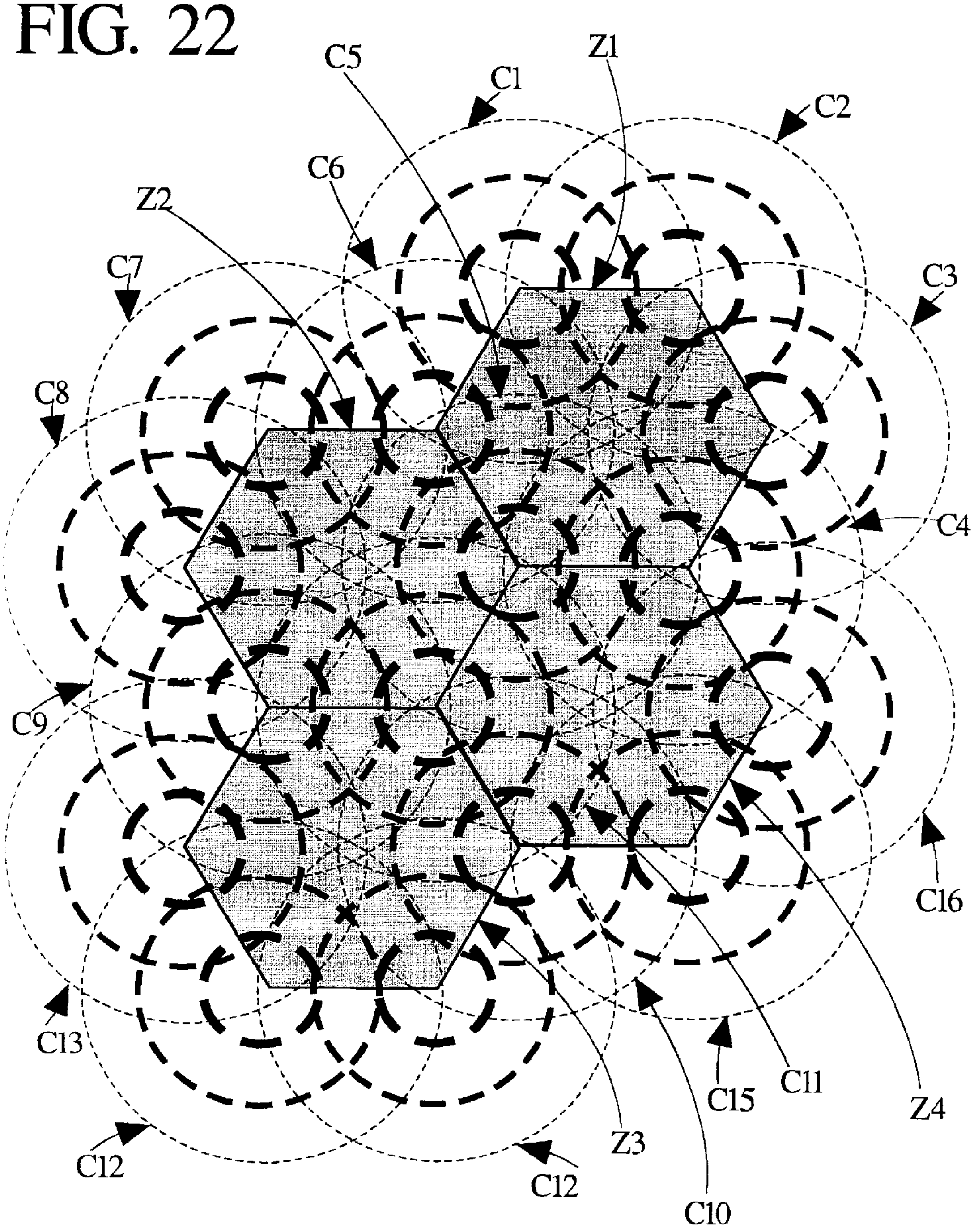
FIG. 22 depicts a hexagonal grid showing uplink and downlink primary attenuation lobe contour map from one or more of the claimed ball antenna arrays.

FIG. 22: Hexagonal grid showing either uplink or downlink primary attenuation lobe contour map from one or more of the claimed ball antenna arrays This FIG. displays a hexagonal grid pattern which is applicable for either uplink or downlink directional antenna component of the claimed directional antenna arrays. Note that hexagonal zones Z1 to Z4 are covered by directional antenna component primary lobe attenuation contours C1 to C16.

Certain preferred embodiments will have uplink and downlink pattern hexagonal patterns wherein the sizes of the hexagonal tiles differ between uplink and downlink grids. Certain preferred embodiments will use other tiling shapes as well as but not limited to differing sizes of tiling shapes.

Figure 23:
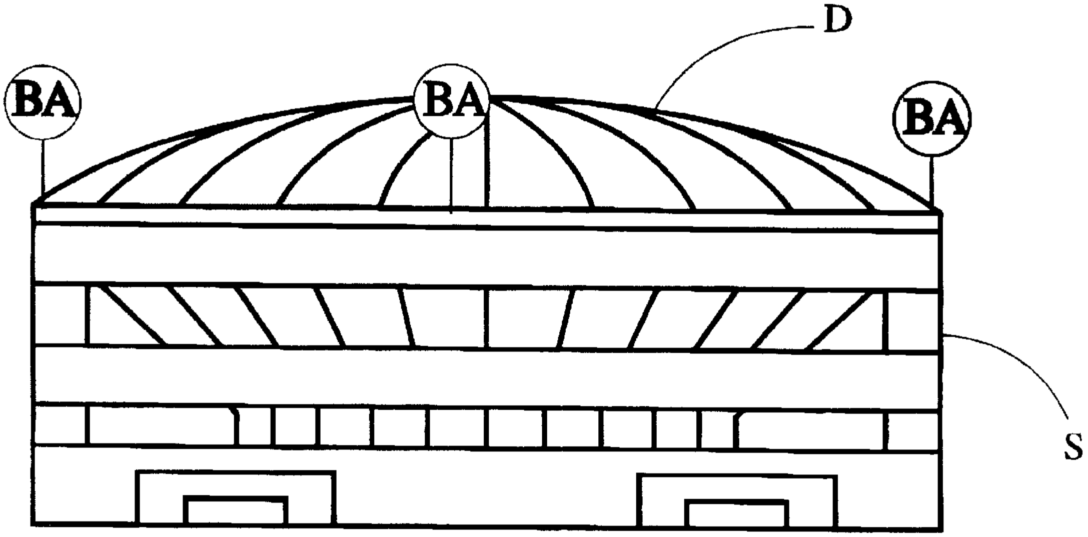
FIG. 23 depicts ball arrays positioned outside a domed stadium.

FIG. 23: Use of Ball Arrays positioned outside a domed stadium.

In certain preferred embodiment applications, a domed stadium or other large, enclosed building requires very dense cellular user support outside said building or buildings. Positioning Ball Antenna Arrays at a height above the building or buildings provides the ability to significantly increase cellular density through te previously disclosed discussions of this patent.

Figure 24:
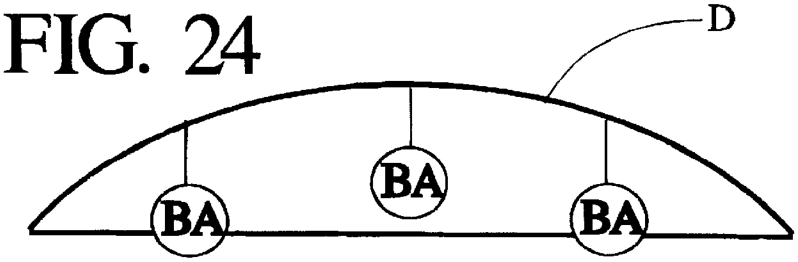
FIG. 24 depicts ball arrays suspended from the ceiling of a domed stadium.

FIG. 24: Use of Ball Arrays suspended from the ceiling of a domed stadium.

In certain preferred embodiment applications, a domed stadium or other large, enclosed building requires very dense cellular user support within said building or buildings. Positioning Ball Antenna Arrays from the ceiling or dome of said building or buildings provides the ability to significantly increase cellular density through the previously disclosed discussions of this patent.

Figure 25:
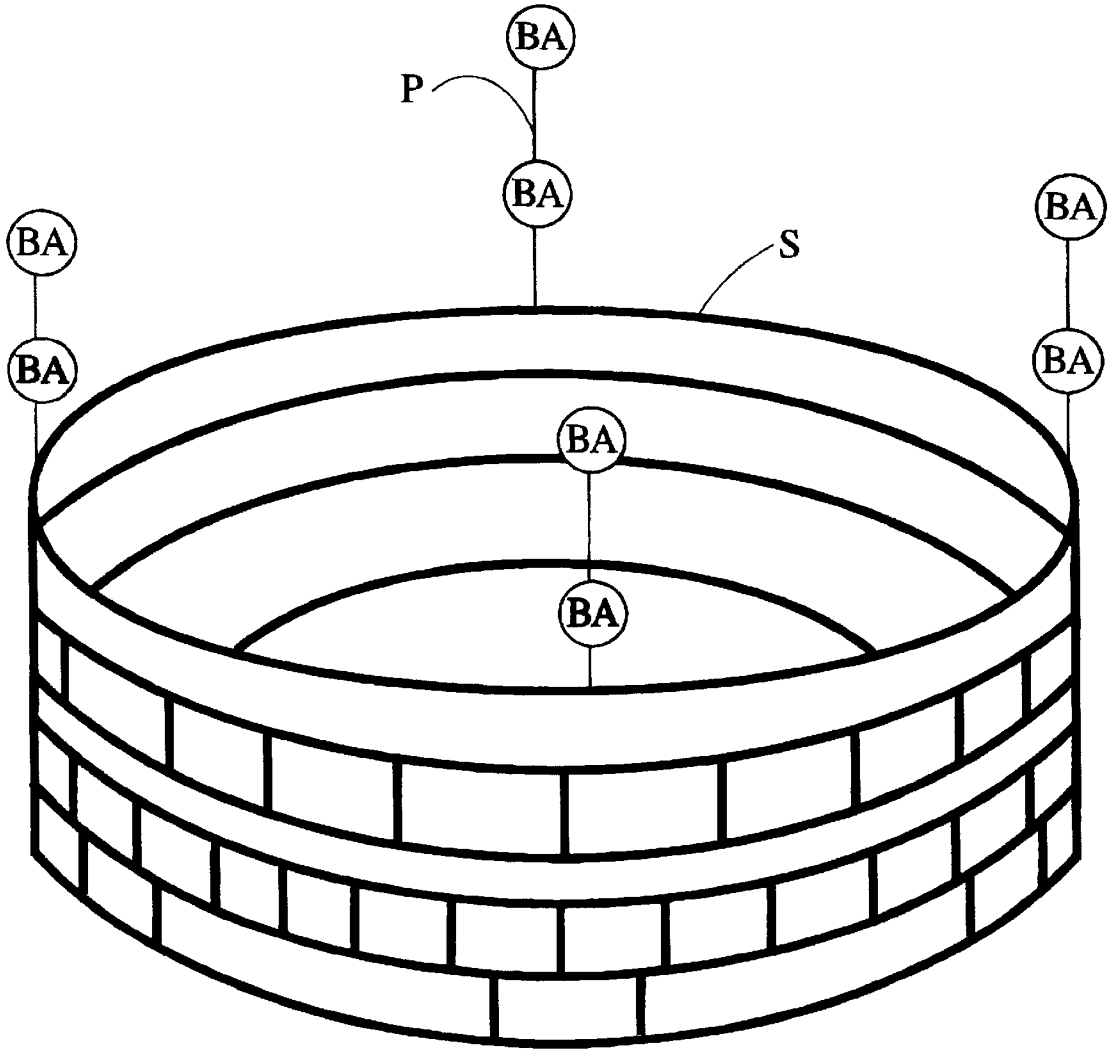
FIG. 25 depicts ball arrays stationarily positioned about an amphitheater.

FIG. 25: Use of Ball Arrays stationarily positioned about an amphitheater.

In certain preferred embodiment applications, an amphitheater or open stadium S requires very dense cellular user support either inside, outside or both inside and outside said structure. Positioning Ball Antenna Arrays at a height above the building or buildings provides the ability to significantly increase cellular density. In certain preferred embodiments, more than one Ball Antenna Arrays may be positioned successively upon poles P.

Figure 26:
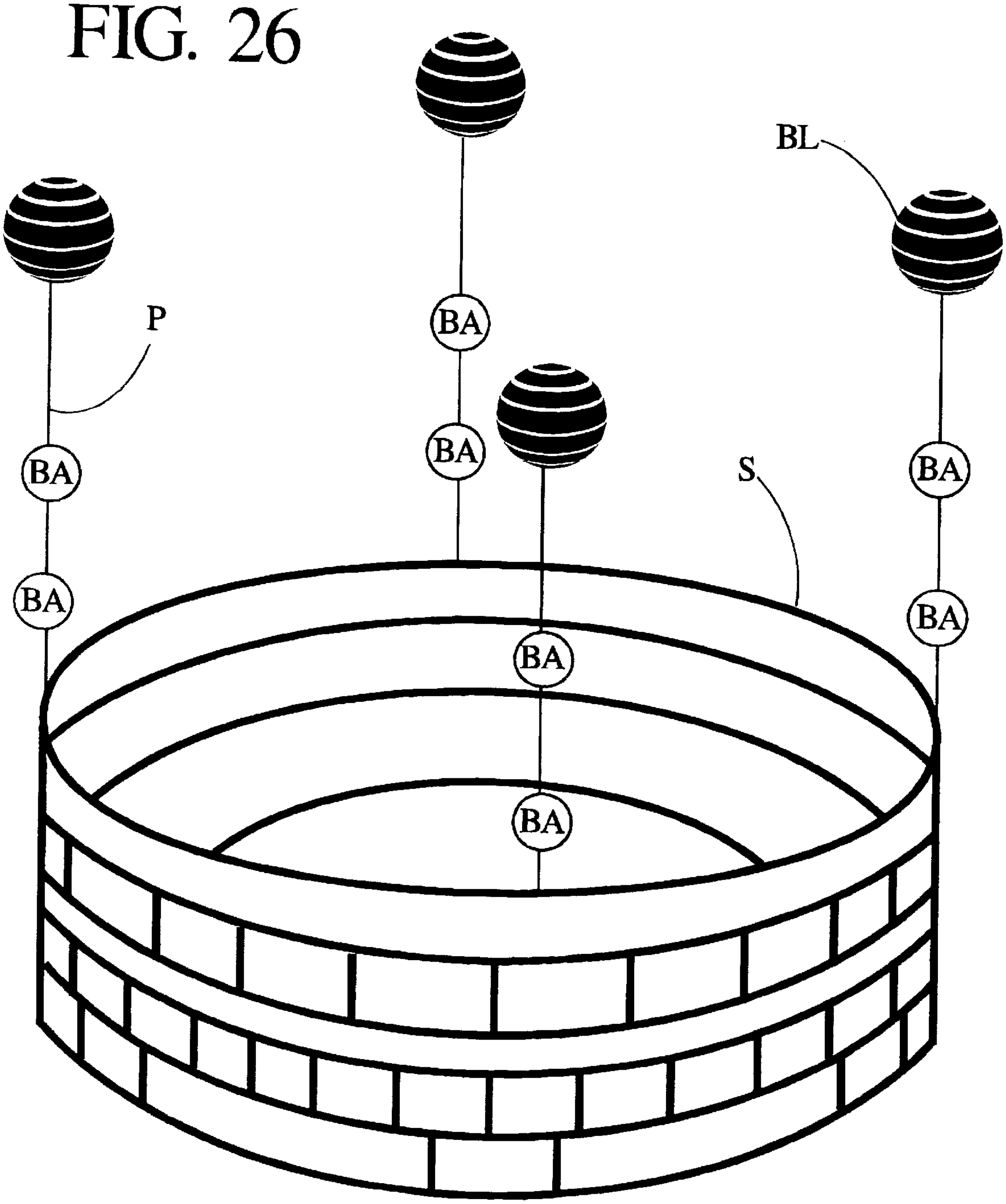
FIG. 26 depicts ball arrays suspended from flotation devices such as balloons and anchored to earth.

FIG. 26: Use of Ball Arrays suspended from flotation devices and anchored to earth.

In certain preferred embodiment applications, including but not limited to open stadiums S, open air entertainment events, and the like, a temporary requirement for dense user support may exist. In such cases, assuming a climate which can support it, one or more instances of Ball Antenna Arrays may be strung on flexible poles P and suspended from balloons or other flotation devices BL.

Note that in some preferred embodiments, the poles P may be rope-like, such as being composed of airplane cable for instance.

In some preferred embodiments, position sensing circuitry may be incorporated to accurately locate the Ball Antenna Arrays to aid in calculating user location information. Note that such position sensing equipment may be incorporated as a preferred embodiment into any of the previously disclosed preferred embodiments.

Figure 27:
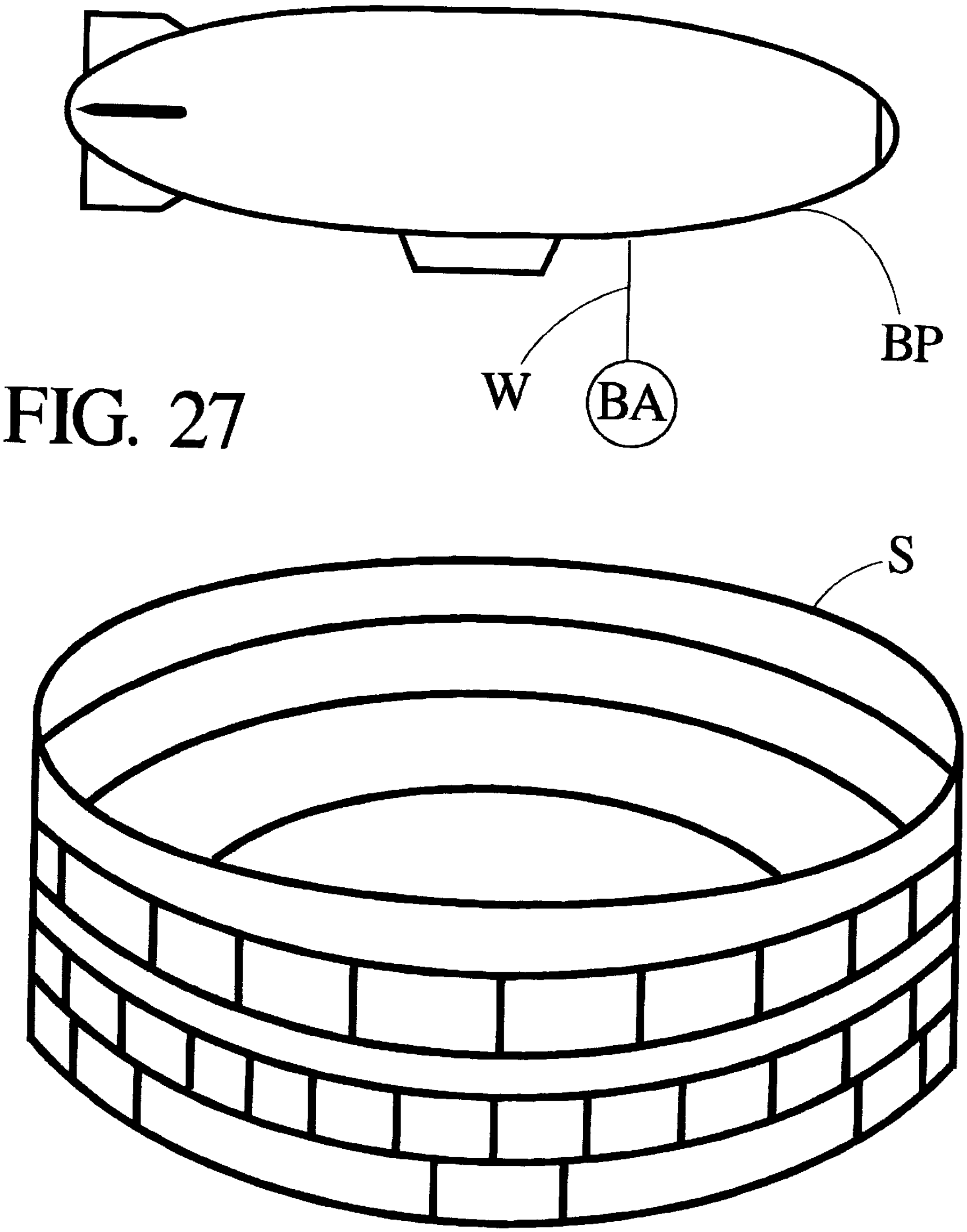
FIG. 27 depicts ball arrays carried by an airborne device such as a blimp or Unmanned Airborne Vehicle.

FIG. 27: Use of Ball Arrays carried by airborne device such as a blimp or Unmanned Airborne Vehicle.

FIG. 27 disclosed a referred embodiment wherein a blimp incorporates one or more Ball Antenna Arrays. In this figure, the blimp can be seen to be providing support for a cellular user population in the neighborhood of a stadium.

The mechanism by which one or more Ball Antenna Arrays are carried and supported aloft in preferred embodiments includes but is not limited to lighter than aircraft, both manned and unmanned heavier than aircraft.

Note that other preferred embodiments include but are not limited to Ball Antenna Arrays being embedded in the flight surfaces of the airborne vehicle.

What is claimed is:

1. An device comprising a. two or more transmitting directional antennae whereby
   i. each antenna has a defined
      (1) base location vector,
      (2) orientation direction vector
      (3) attenuation function
      (4) interface circuitry
   ii. each antenna orientation direction vector lines in the major axis of the contour map of said antenna's said attenuation function
   iii. said antenna base location vectors are proximate to said boundary of a convex shape in 2 or more dimensions
   iv. for each said antenna, there exists at least one other antenna whereby the main attenuation lobes overlap
   v. one or more of said antenna interface circuits receive one transmission data streams from said information processor for each said antenna
   vi. each said antenna transmits a signal based upon that received transmission data stream from said transmission information processor b. said antennae possess a shared center wherein
   i. the base location vector of each antenna is a distance from said antenna collection center which is a small fraction of the distance traveled by a signal propagating in the communications medium within the time step of antenna interface sampling circuitry
   ii. associated with the antenna shared center is an angular measure or one or more dimensions so that the user transmission/reception domain can be mapped in c. transmission information processor whereby
   i. said information processor receives external data streams for more than one channel of communication
   ii. said transmission data stream is generated by linear combination of elements of said external data streams for more than one communication channel.

2. A communications device as in claim 1 additionally comprised of a. two or more receiving directional antennae whereby
   i. each antenna has a defined
      (1) base location vector,
      (2) orientation direction vector
      (3) attenuation function
      (4) interface circuitry
   ii. each antenna orientation direction vector lines in the major axis of the contour map of said antenna's said attenuation function
   iii. said antenna base location vectors are proximate to said boundary of a convex shape in 2 or more dimensions
   iv. for each said receiver antenna, there exists at least one other receiver antenna whereby the main attenuation lobes overlap
   v. each said receiver antenna interface circuit generates one or more quantities over time intervals based upon the physical state of the receiver antenna b. said receiver antenna collection possesses a shared center wherein
   i. the base location vector is a distance from said receiver antenna shared center which is a small fraction of the distance travel by a signal propagating in the communications medium within the time step of antenna interface sampling circuitry
   ii. associated with the receiver antenna shared center is an angular measure or one or more dimensions so that the user transmission/reception domain can be mapped in c. one or more receiver information processors whereby
   i. said receiver antenna generated quantities are received by said information processors
   ii. said received antenna generated quantities are related by linear combination of user area transmission strengths
   iii. said user area transmission strengths at a given time step at a each discrete time-propagation-displacement step and each discrete angular-dimensional displacement step can be reasonably approximated by a linear combination of antenna generated quantities received by said information processor at said given time step and a finite number of time steps thereafter.

3. A device as in claim 1 or 2 wherein said convex shape is 2-dimensional.

4. A device as in claim 1 or 2 wherein said convex shape is 3-dimensional.

5. A device as in claim 3 wherein the shape is proximately a circle.

6. A device as in claim 4 wherein the shape is proximately a whole or partial sphere.

7. A device as in claim 4 wherein the shape is proximately a whole or partial ellipsoid.

8. A device as in claim 4 wherein the shape is proximately a whole or partial cylinder with convex ends.

9. A device as in claim 1 or 2 wherein all said antenna orientation vectors possess the same sign dot product with respect to the normal of the convex shape local to the base location vectors.

10. A device as in claim 9 wherein each said antenna orientation vector is normal to said proximate convex shape local to said antenna's base location vector.

11. A device as in claim 1 or 2 wherein the polarization of each antenna is effectively identical.

12. A device as in claim 1 or 2 wherein the said user area transmission strengths are evaluated at non-uniform discrete steps in at least one dimension.

13. A device as in claim 1 or 2 wherein each said directional antenna possesses a reflective surface.

14. A device as in claim 13 wherein all said directional antenna reflective surfaces collectively form a single connected surface when in operation.

15. A device as in claim 14 wherein said single connected surface during operation is comprised of two or more surfaces which when assembled provide the operational surface.

16. A device as in one of claims 1 through 15 additionally comprising an encapsulating shell of material wherein said shell material is approximately transparent to the electromagnetic signals being received by said antennae.

17. A device as in one of claims 1 through 15 including, a. one or more additional receiving antennas with the necessary circuitry b. whereby a collection of one or more signals fed from the additional antennas can be demodulated and amplified for reception.

18. A device as in one of claims 1 through 15 comprising, a. additionally one or more transmitting antennas with the necessary circuitry b. whereby a collection of one or more signals can be modulated and amplified for transmission by said additional transmitting antennas.

19. A device as in claim 18 including, a. first additional circuitry connecting the transmitting and receiving circuitry to one or more telephone or telecommunications network systems plus b. second additional circuitry controlling the communication processes of this device.

20. A device as in claim 19 performing the functions of a cellular base station.

21. A device as in claim 20 wherein said device functions as a base station in the Collectors patent.

22. A communications device for transmitting to users in a communication medium with device signals comprising, one or more information processors for transforming, for each of a number of time steps, the device signals into quantities collectively forming a linear combination of discrete time-propagation displacements and discrete location displacements as a function of a user location relative to a location of the communications device, an antenna collection including two or more directional transmitting antennae where each antenna is defined by a base location vector, an attenuation function having a contour map and an antenna orientation direction vector lying in the contour map and where each antenna connects to an antenna interface circuit having time steps for receiving ones of said quantities, and wherein the contour map for one of the directional antennae overlaps the contour map of another one of the directional antennae, said antenna collection having said two or more directional antennae with base location vectors proximate to a common boundary of a shape in two or more dimensions, said antenna collection having a collection center wherein the base location vector for each of said antenna is a distance from said collection center which is small compared with the distance traveled by user transmissions propagating in the communications medium within the time step of the antenna interface sampling circuitry and wherein the antenna orientation direction vector for each of said antenna has a location measure in one or more dimensions relative to the antenna collection center, said antenna collection having means for selecting ones of said quantities for connection to ones of said directional transmitting antennae for transmission to a particular user.

* * * * *